United States Patent
Miyazawa

(10) Patent No.: US 8,464,151 B2
(45) Date of Patent: Jun. 11, 2013

(54) LAYOUT OF FIELD AREA WHERE MERCHANDISE AND ADVERTISING INFORMATION ARE INSERTED OR DETERMINING POSITION AND SIZE OF AREA WHERE MERCHANDISE AND ADVERTISING INFORMATION FLOW

(75) Inventor: Hiroyasu Miyazawa, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1794 days.

(21) Appl. No.: 11/458,877

(22) Filed: Jul. 20, 2006

(65) Prior Publication Data

US 2007/0038929 A1 Feb. 15, 2007

(30) Foreign Application Priority Data

Aug. 9, 2005 (JP) ................................. 2005-231172

(51) Int. Cl.
*G06F 17/00* (2006.01)
(52) U.S. Cl.
USPC ............ 715/271; 715/253; 715/246; 715/243
(58) Field of Classification Search
USPC ................. 715/271, 225, 227, 209, 243, 244, 715/245, 246, 253
See application file for complete search history.

(56) References Cited

U.S. PATENT DOCUMENTS

| | | | | |
|---|---|---|---|---|
| 5,999,912 A * | 12/1999 | Wodarz et al. | ................... | 705/14 |
| 6,064,980 A | 5/2000 | Jacobi et al. | | |
| 7,143,110 B2 | 11/2006 | Tomari et al. | ............... | 707/104.1 |
| 2002/0069261 A1 * | 6/2002 | Bellare et al. | ................... | 709/218 |
| 2002/0133398 A1 * | 9/2002 | Geller et al. | ...................... | 705/14 |
| 2003/0070167 A1 * | 4/2003 | Holtz et al. | ....................... | 725/32 |
| 2005/0172221 A1 | 8/2005 | Kobashi et al. | ................ | 715/513 |
| 2006/0150088 A1 * | 7/2006 | Kraft et al. | ...................... | 715/517 |
| 2006/0178934 A1 * | 8/2006 | Besmertinik et al. | ........... | 705/14 |
| 2009/0254635 A1 * | 10/2009 | Lunt | .............................. | 709/219 |

FOREIGN PATENT DOCUMENTS

| | | |
|---|---|---|
| CN | 1335964 A | 2/2002 |
| CN | 1648846 | 8/2005 |
| JP | 07-129658 | 5/1995 |
| JP | 2001-525951 | 12/2001 |
| JP | 2004-171395 | 6/2004 |
| JP | 2005-122322 | 5/2005 |
| WO | 97/21183 | 6/1997 |

OTHER PUBLICATIONS

Chinese Office Action dated Nov. 9, 2007, regarding Application No. 2006101107001.
Japanese Office Action dated Dec. 24, 2010, in Japanese Application No. 2005-231172.
Japanese Office Action dated Mar. 11, 2011, in Japanese Application No. 2005-231172.

* cited by examiner

*Primary Examiner* — Adam M Queler
(74) *Attorney, Agent, or Firm* — Fitzpatrick, Cella, Harper & Scinto

(57) ABSTRACT

Association information representing the association between the first information and the second information is set in the first record belonging to the first information and the second record belonging to the second information that are stored in a storage medium. A field area where data of the designated first record is inserted and a field area where data of the second record associated with the first record is inserted in accordance with the association information are laid out in a page on the basis of the template.

19 Claims, 39 Drawing Sheets

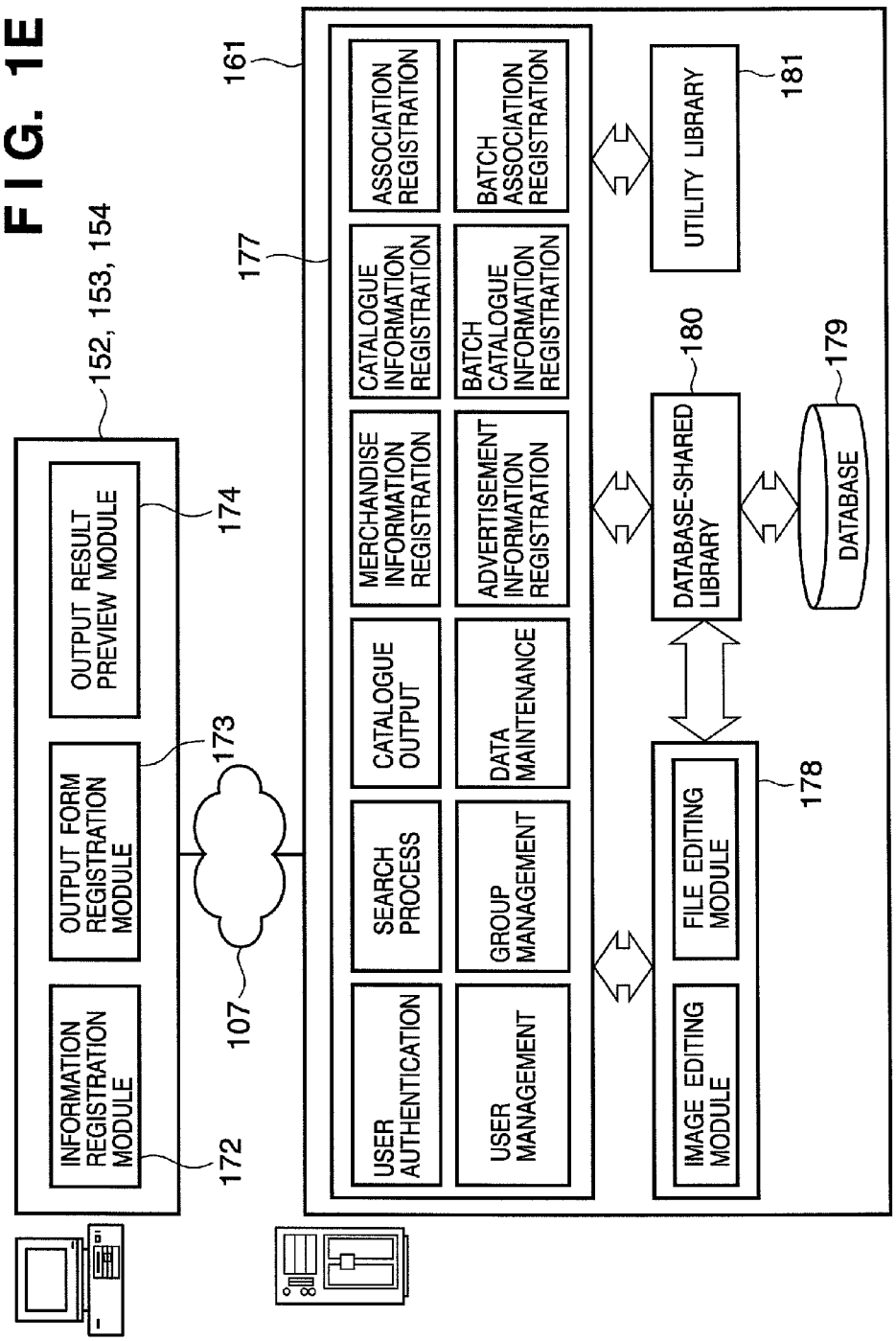

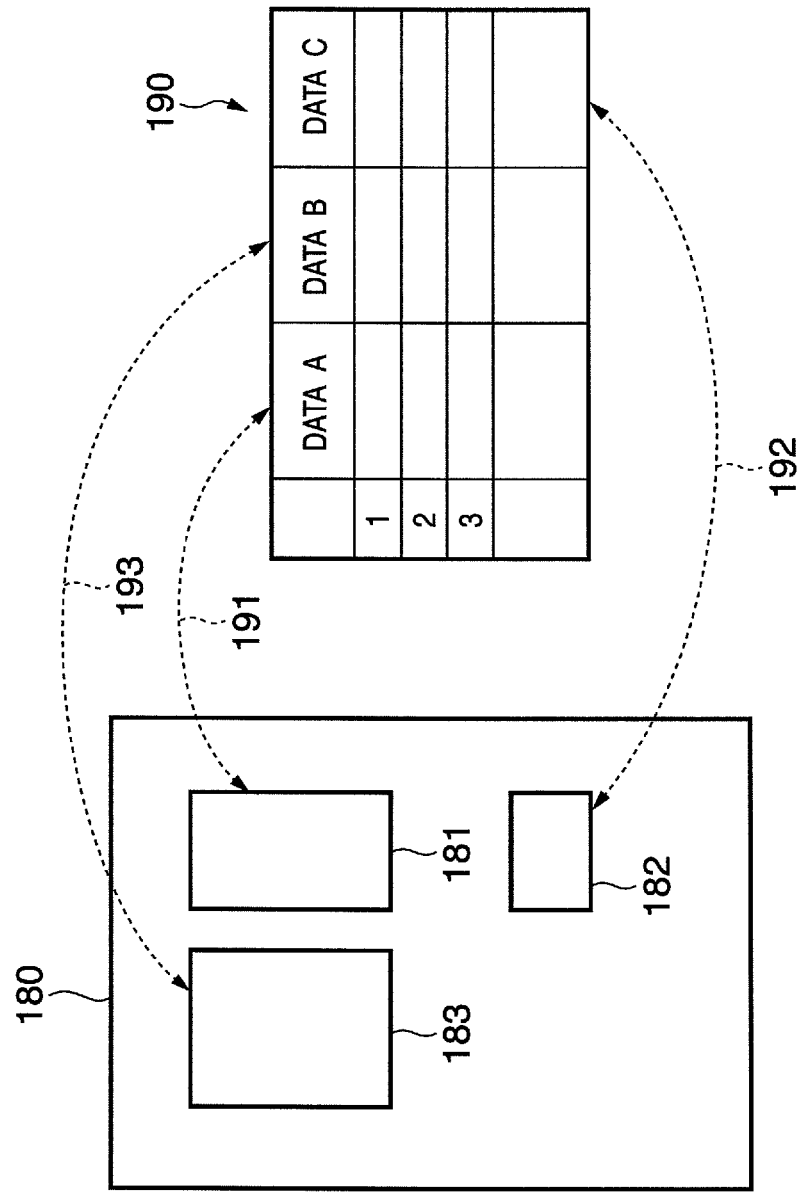

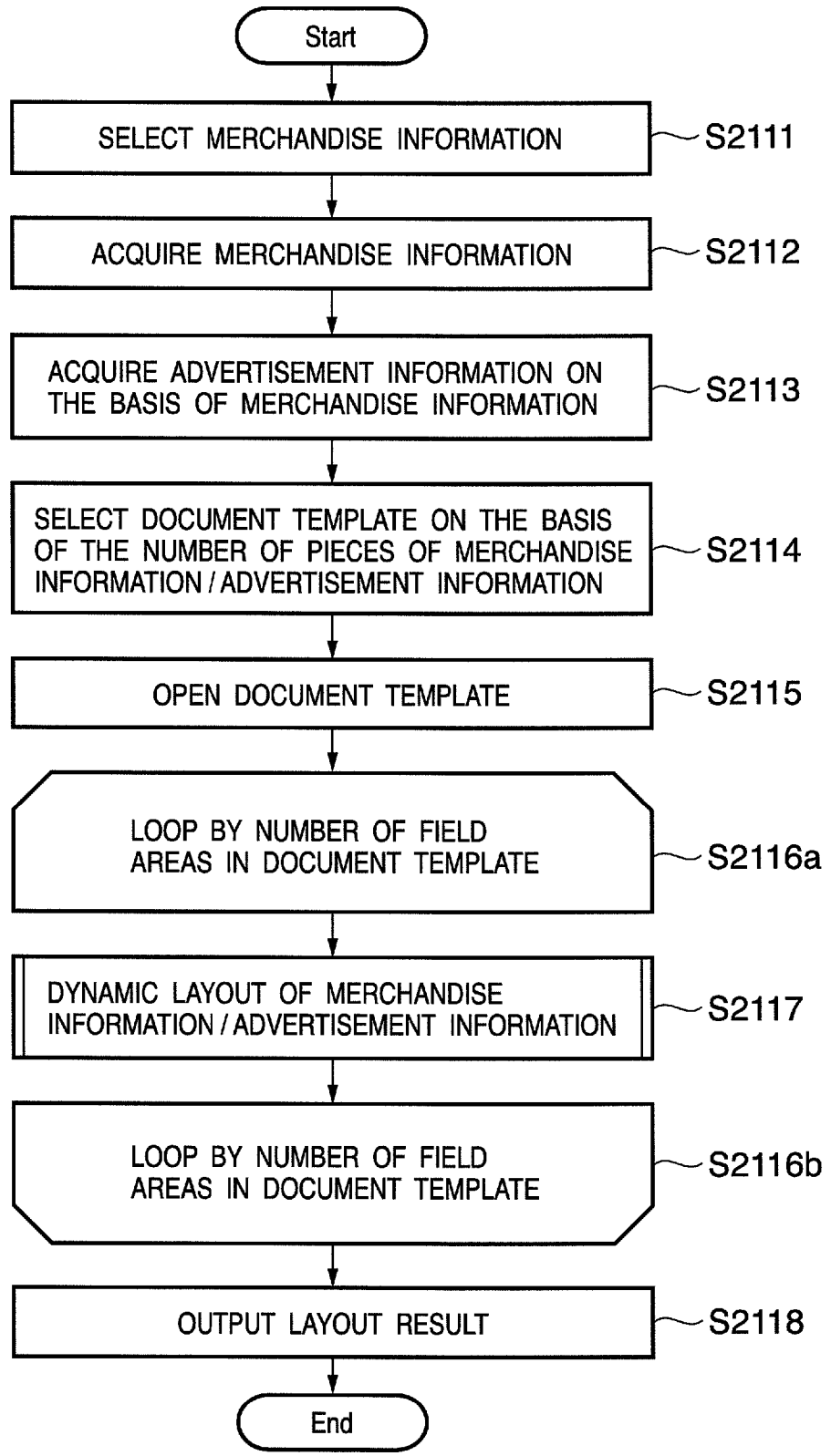

F I G. 23B
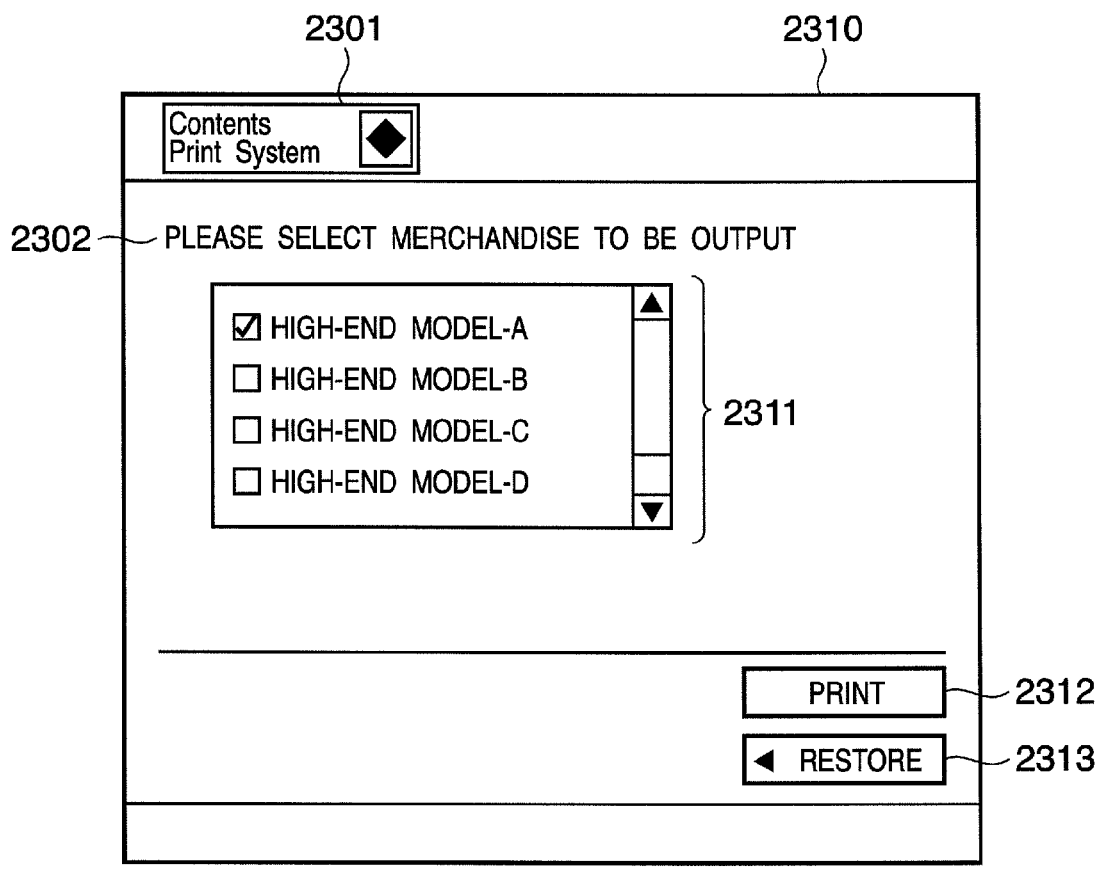

LAYOUT OF FIELD AREA WHERE MERCHANDISE AND ADVERTISING INFORMATION ARE INSERTED OR DETERMINING POSITION AND SIZE OF AREA WHERE MERCHANDISE AND ADVERTISING INFORMATION FLOW

BACKGROUND OF THE INVENTION

1. Field of the Invention

The present invention relates to an information processing apparatus which lays out, in a page on the basis of a template, field areas for inserting data of data fields selected from a record made up of a plurality of types of data fields, a control method therefor, and a program.

2. Description of the Related Art

As various kinds of merchandise are produced, shortening of the merchandise life has recently received attention. The necessity for CRM (Customer Relationship Management) and one-to-one marketing has also received a great deal of attention due to factors such as customer's orientation to customized services as the use of the Internet spreads. These methods try to raise the customer satisfaction, win new customers, and keep customers.

One-to-one marketing is a kind of database marketing. According to this technique, a database of individual attribute information including the age, gender, hobby, preference, and purchase log of a customer, is created, and the contents of the database are analyzed to make a proposal complying with customer's needs. A typical method of this marketing is variable printing. These days, a variable printing system which customizes a document for each customer and outputs the document has been developed along with the development of the DTP (Desk Top Publishing) technique and the pervasion of digital printing apparatuses. The variable printing system needs to create a customized document in which contents of different amounts for respective customers are optimally laid out.

Generally, when such a customized document is to be created by the variable printing system, containers are laid out in a document. The container is a drawing area for drawing contents (drawing contents (e.g., an image and text)), and is also called a field area.

Containers are laid out in a document, and a database is associated with the layout (various contents in the database are associated with the containers). As a result, a desired customized document (called a document template) can be created. The contents of the customized document can be changed (made variable) by properly switching contents in the containers in the customized document (by changing the association). Such a document is called a variable data document, and a printing system using the variable data document is a variable printing system.

In a conventional variable printing system, the size of a container associated with a text or image serving as contents is fixed. When contents in the database are inserted (flowed) into a container and the data amount is larger than the container size, the following problems arise. That is, if the data is a text, overlapping of the text occurs. If the data is its image, clipping of the image occurs. When the data amount is smaller than the container size, no proper display may be obtained such that a gap appears between the container and its internal contents.

As another technique of changing the layout in order to solve these problems, a "Layout Designing Apparatus" in Japanese Patent Laid-Open No. 7-129658 (paragraph 0049, FIG. 8) discloses a technique of, when the size of a given container becomes large, decreasing the size of another container adjacent to the given container.

Japanese Patent Laid-Open No. 2004-171395 (paragraph 0051, FIG. 8) discloses another technique. That is, the items of merchandise specifications such as price, running cost, and processing speed are rearranged in accordance with the priority order of customer's demands. Then, data are input to field areas, and a customized catalogue is saved and output.

In the prior arts, however, when an advertisement is dynamically inserted into a merchandise catalogue to output the merchandise catalogue, a field area for the advertisement is fixed. If the image size or text length changes, the layout is deformed, resulting in a catalogue of poor appearance. In order to solve this problem, the catalogue must be manually edited in advance, decreasing the efficiency.

SUMMARY OF THE INVENTION

The present invention has been made to overcome the conventional drawbacks, and has as its object to provide an information processing apparatus capable of suitably, properly laying out pieces of associated information in a page, a control method therefor, and a program.

According to the present invention, the foregoing object is attained by providing an information processing apparatus which lays out, in a page on the basis of a template, field areas for inserting data of data fields selected from a record made up of a plurality of types of data fields, comprising:

first storage means for storing a first record belonging to first information and a second record belonging to second information;

second storage means for storing association information representing association between the first information and the second information; and layout means for laying out, in a page on the basis of the template, a field area where data of the designated first record is inserted and a field area where data of the second record associated with the first record is inserted in accordance with the association information.

In a preferred embodiment, the layout means lays out, in a page on the basis of the template, a first record field area where the data of the designated first record is inserted, and then lays out, in the same page, a second record field area where the data of the second record associated with the first record is inserted in accordance with the association information.

In a preferred embodiment, the apparatus further comprises output means for outputting a layout result by the layout means.

In a preferred embodiment, the apparatus further comprises setting means for setting the association information representing the association between the first information and the second information, the setting means further comprising priority order setting means for setting priority order at which the data of the second record is inserted into the field area.

In a preferred embodiment, the apparatus further comprises setting means for setting the association information representing the association between the first information and the second information, the setting means further comprising frequency setting means for setting a frequency at which the data of the second record is inserted into the field area.

In a preferred embodiment, the information processing apparatus is a server apparatus connected to a network.

In a preferred embodiment, the apparatus further comprises transmission means for transmitting, to a client apparatus connected to the network, a preview window for previewing a layout result by the layout means.

In a preferred embodiment, the apparatus further comprises transmission means for transmitting a layout result by the layout means to an image forming apparatus connected to the network.

According to the present invention, the foregoing object is attained by providing a method of controlling an information processing apparatus which lays out, in a page on the basis of a template, field areas for inserting data of data fields selected from a record made up of a plurality of types of data fields, comprising:

a setting step of setting association information representing association between first information and second information in a first record and second record which are stored in a storage medium, the first record belonging to the first information and the second record belonging to the second information; and a layout step of laying out, in a page on the basis of the template, a field area where data of the designated first record is inserted and a field area where data of the second record associated with the first record is inserted in accordance with the association information.

According to the present invention, the foregoing object is attained by providing a program for causing a computer to execute control of an information processing apparatus which lays out, in a page on the basis of a template, field areas for inserting data of data fields selected from a record made up of a plurality of types of data fields, characterized by causing the computer to execute a setting step of setting association information representing association between first information and second information in a first record and second record which are stored in a storage medium, the first record belonging to the first information and the second record belonging to the second information, and a layout step of laying out, in a page on the basis of the template, a field area where data of the designated first record is inserted and a field area where data of the second record associated with the first record is inserted in accordance with the association information.

According to the present invention, the foregoing object is attained by providing an information processing apparatus comprising:

selection means for selecting first information;

acquisition means for acquiring second information on the basis of the first information selected by the selection means;

determination means for determining, by using a template, positions and sizes of respective areas where information on the first information selected by the selection means and information on the second information acquired by the acquisition means are flowed; and flowing means for flowing the information on the first information and the information on the second information into the areas of the positions and sizes determined by the determination means.

In a preferred embodiment, the template is determined on the basis of the first information selected by the selection means and the second information acquired by the acquisition means.

In a preferred embodiment, the template is determined on the basis of the number of pieces of second information acquired by the acquisition means.

According to the present invention, the foregoing object is attained by providing a layout method comprising:

a selection step of selecting first information;

an acquisition step of acquiring second information on the basis of the first information selected in the selection step;

a determination step of determining, by using a template, positions and sizes of respective areas where information on the first information selected in the selection step and information on the second information acquired in the acquisition step are flowed; and a flowing step of flowing the information on the first information and the information on the second information into the areas of the positions and sizes determined in the determination step.

According to the present invention, the foregoing object is attained by providing a program characterized by causing a computer to execute a selection step of selecting first information, an acquisition step of acquiring second information on the basis of the first information selected in the selection step, a determination step of determining, by using a template, positions and sizes of respective areas where information on the first information selected in the selection step and information on the second information acquired in the acquisition step are flowed, and a flowing step of flowing the information on the first information and the information on the second information into the areas of the positions and sizes determined in the determination step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1E is a block diagram showing the functional configuration of the Web server-client system according to the embodiment of the present invention;

FIG. 3A is a view for explaining an outline of variable data printing according to the embodiment of the present invention;

FIG. 21B is a flowchart showing a process of outputting a document template having advertisement information field areas according to the embodiment of the present invention;

FIG. 23B is a view showing an example of a merchandise master data selection window in the image forming apparatus according to the embodiment of the present invention;

DESCRIPTION OF THE EMBODIMENTS

A preferred embodiment of the present invention will be described in detail in accordance with the accompanying drawings.

<System Configuration>

The hardware configuration of an information processing system and that of a host computer as a building component of the information processing system according to the embodiment will be described with reference to FIGS. 1A and 1B.

Figure 1A:
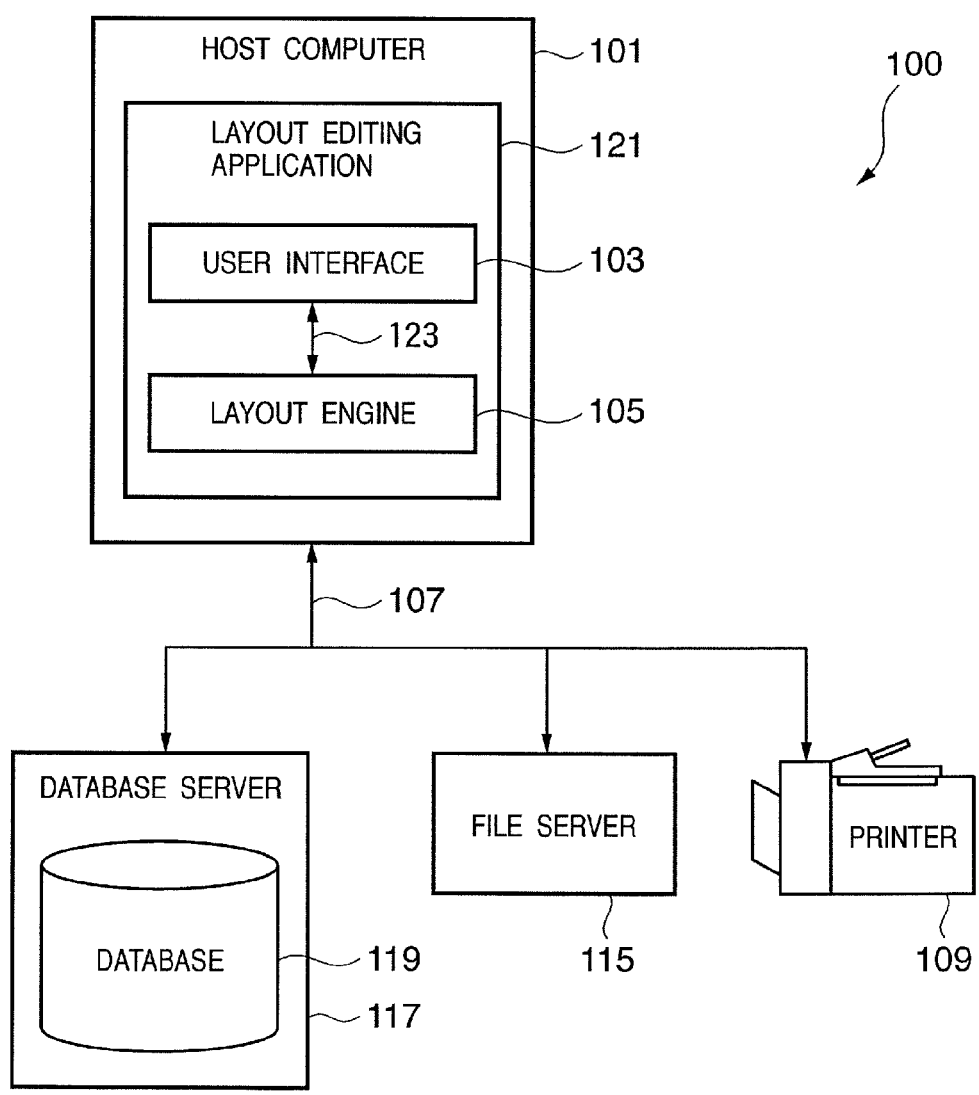
FIG. 1A is a block diagram showing an example of the configuration of an information processing system according to an embodiment of the present invention.

FIG. 1A is a block diagram showing an example of the configuration of the information processing system according to the embodiment of the present invention. FIG. 1B is a block diagram showing the hardware configuration of the host computer (corresponding to an information processing apparatus of the present invention) as a building component of the information processing system according to the embodiment of the present invention.

Figure 1B:
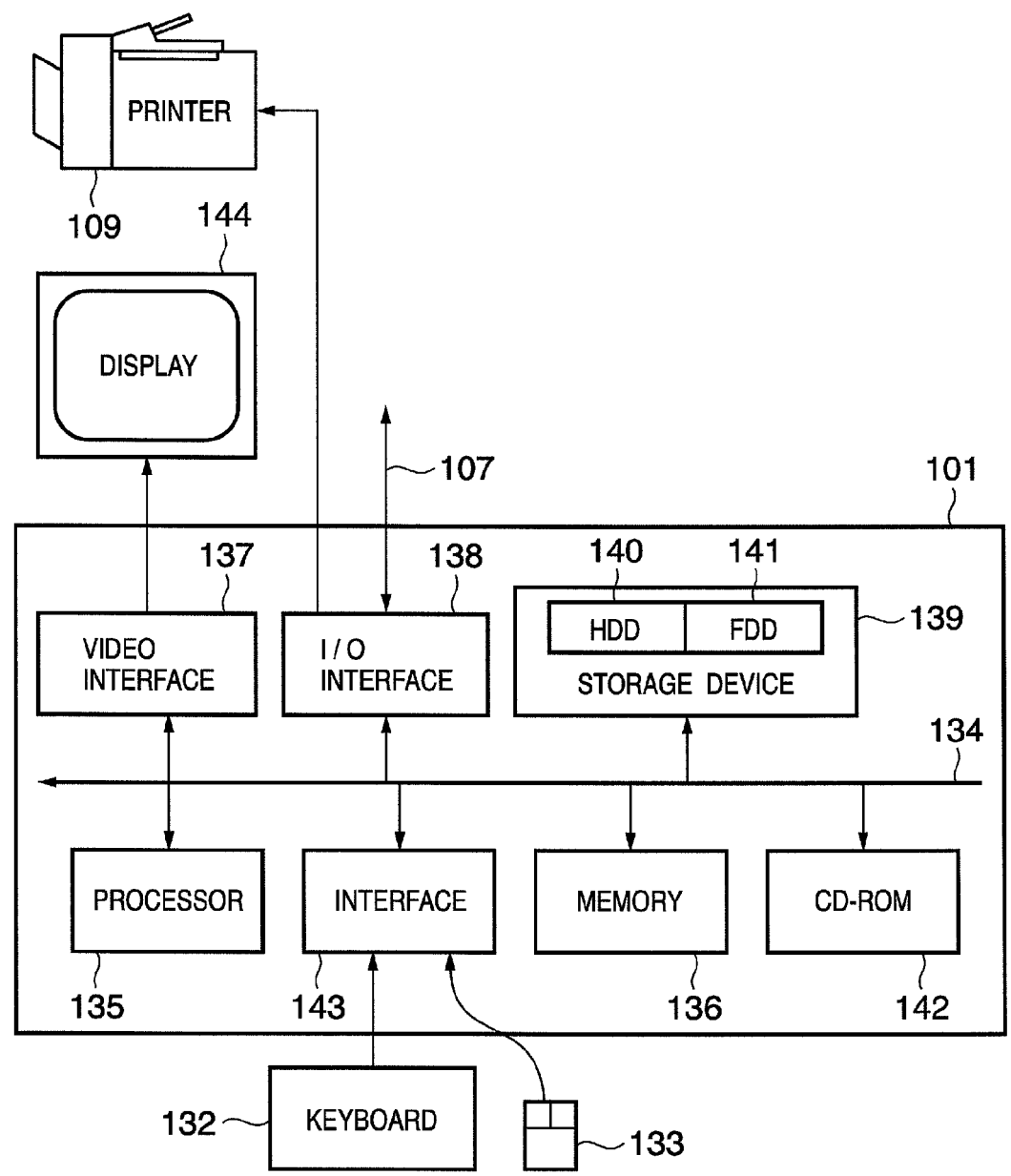
FIG. 1B is a block diagram showing the hardware configuration of a host computer as a building component of the information processing system according to the embodiment of the present invention.

Various computers (e.g., a database server 117 and file server 115) other than the host computer in FIG. 1A also have the same hardware configuration as, e.g., that in FIG. 1B.

In FIG. 1A, an information processing system 100 is built by connecting a host computer 101, the database server 117, the file server 115, and an image forming apparatus 109 (e.g., printer) via a network 107.

The database server 117 comprises a database 119. The image forming apparatus 109 can properly print print data received via the network 107.

The information processing system 100 in FIG. 1A especially shows an example of the configuration of a variable printing system which prints a variable data document. A variable printing process to be described in the embodiment is implemented by the host computer 101 (formed from a general-purpose computer module) which functions as a layout editing apparatus.

A layout editing application 121 which can run in the variable printing system 100 is executed completely or partially by the host computer 101. In particular, a process associated with layout editing and a process associated with printing of a variable data document are implemented by software which is executed by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. The image forming apparatus 109 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a Floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or typically in accordance with an operating system. Alternatively, this communication is done by a method in a conventional operation mode of a computer system which is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

In the embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or Floppy® disk. This program is loaded via the corresponding CD-ROM drive 142 or Floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, or a magneto-optical disk. These software programs may also be loaded into the host computer 101 by radio communication (e.g., infrared communication) between the host computer 101 and another device. These software programs may also be loaded into the host computer 101 from a computer-readable card (e.g., a PCMCIA card), or another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)). The layout editing application 121 includes two software components: a layout engine 105 and user interface 103.

The layout engine 105 is a software component for loading records one by one from variable data which are stored as records in the database 119, under constraints in size and position on a container (rectangular range) serving as a field area (partial area). Further, the layout engine 105 calculates, from the loaded variable data and the container constraints, the layout including the size and position of a container to which the loaded variable data is flowed.

In the embodiment, the layout engine 105 also performs a process of drawing variable data assigned to a container and generating an image of a variable data document. However, the present invention is not limited to this, and the layout engine 105 operates as an application which determines the size and position of each partial area (container) and outputs drawing information to a printer driver (not shown). The printer driver may perform a variable data document image drawing process and generate print data.

The user interface 103 allows the user to set the layout and attribute of a container and create a document template (to be also referred to as template information). The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data. The variable data document is saved in the local file system of the host computer 101 or the file server 115, or printed directly by the image forming apparatus 109.

Another example of the configuration of the variable printing system 100 will be explained with reference to FIG. 1C.

Figure 1C:
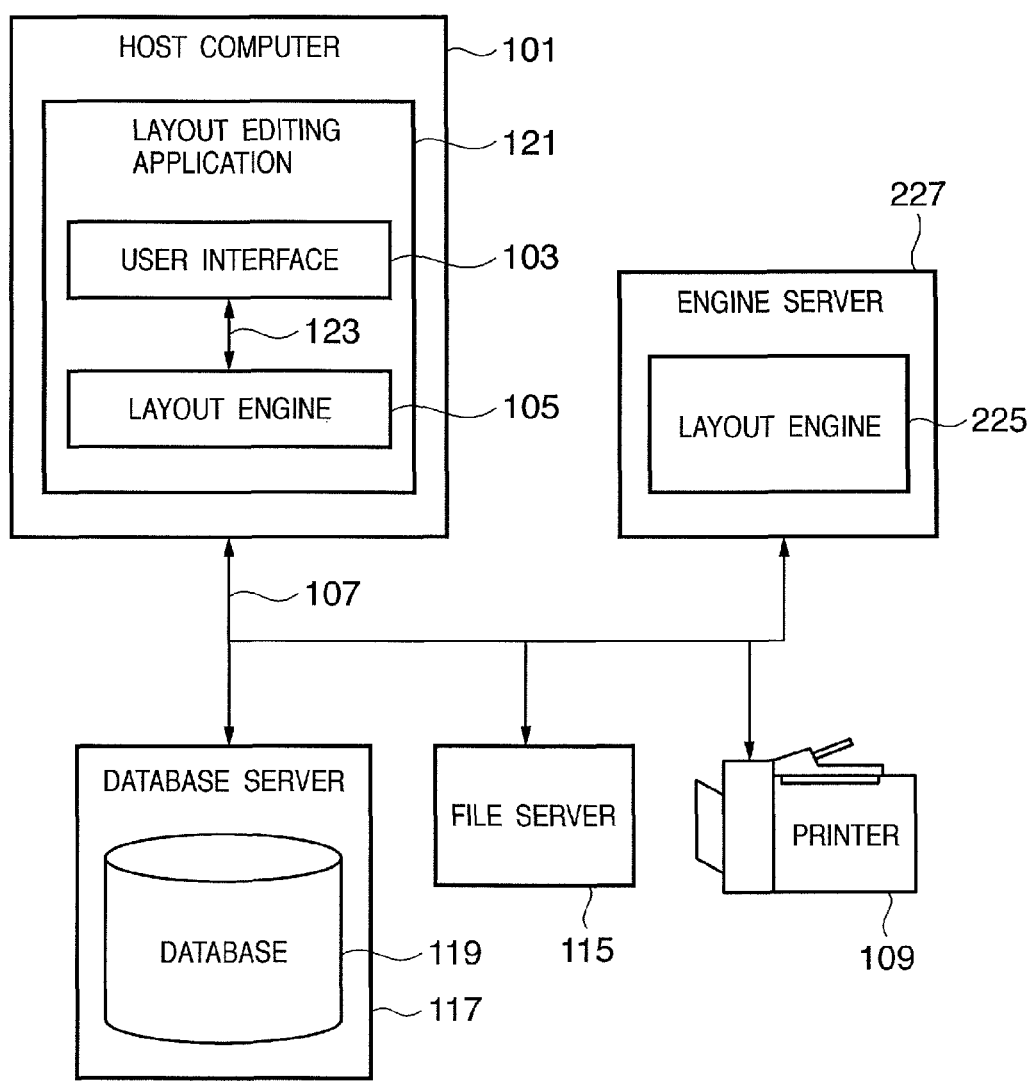
FIG. 1C is a block diagram showing another example of the configuration of the information processing system according to the embodiment of the present invention.

FIG. 1C is a block diagram showing another configuration of the information processing system according to the embodiment of the present invention.

FIG. 1C illustrates an example in which an engine server 227 is added to the network 107 and a layout engine 225 is installed in the engine server 227. That is, in this configuration, the layout engine 105 in the host computer 101 is implemented in the engine server 227. This configuration can reduce the process load of the host computer 101.

The engine server 227 is formed from a typical computer, similar to the remaining servers. A document template saved in the file server 115 can be combined with data saved in the database 119 in order to generate a document by the layout engine 225 for printing or another purpose. Such operation is requested via the user interface 103 or so requested as to print only a specific record.

In FIGS. 1A and 1C, the layout editing application 121 is implemented in a client in a server-client system, but is not limited to this. For example, an application server in which the layout editing application 121 is installed may be configured, and the client may access the application server.

More specifically, a configuration in which a Web server-client system is constructed, the layout editing application 121 is installed in the Web server, and the configurations in FIGS. 1A and 1B are implemented between the Web server and the Web client will be explained.

An outline of the configuration of the Web server-client system will be explained with reference to FIG. 1D.

Figure 1D:
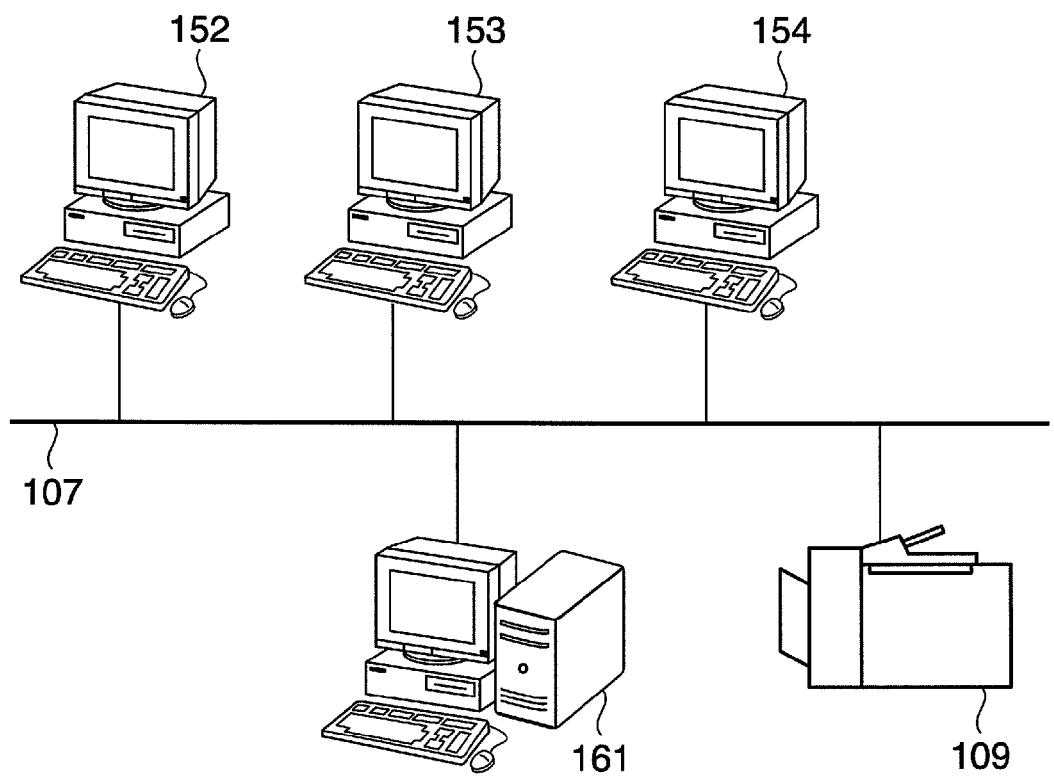
FIG. 1D is a view showing the configuration of a Web server-client system according to the embodiment of the present invention.

FIG. 1D is a view showing the configuration of the Web server-client system according to the embodiment of the present invention.

FIG. 1D shows a configuration which implements instructions/operations from Web clients 152 to 154 having Web browsers to a Web server 161 in which the layout editing application 121 is installed.

In FIG. 1D, the client personal computers (to be referred to as "client PCs" hereinafter) 152 to 154, the server personal computer (to be referred to as a "server PC" hereinafter) 161, and the image forming apparatus 109 are connected to the network 107. These computers have the same hardware configuration as that in FIG. 1B.

The server PC 161 has a Web server function, receives instructions from the client PCs 152 to 154 via their Web browsers, and sends back process results to the Web browsers of the client PCs which have issued the instructions. Note that the present invention does not particularly limit the communication method between the server PC 161 and the client PCs 152 to 154. The single server PC 161 may implement the configurations in FIGS. 1A and 1C.

The functional configuration of the Web server-client system will be explained with reference to FIG. 1E.

FIG. 1E is a block diagram showing the functional configuration of the Web server-client system according to the embodiment of the present invention.

The client PC 152 has a Web browser function. In addition, the client PC 152 comprises an information registration module 172 for registering contents such as catalogue information or image data in the server PC 161. The client PC 152 comprises an output form registration module 173 for registering a form (document template) for outputting merchandise information (content data). The client PC 152 further comprises an output result preview module 174 for previewing the output result of merchandise information.

These modules are automatically distributed as plug-ins of the Web browser from the server PC 161, as needed, and need not be installed in the client PC 152.

The server PC 161 has an HTTP Web application server function. The server PC 161 comprises a module set 177 including various modules for processing requests from the client PC 152.

The module set 177 includes the following modules: for example, a user authentication module, search process module, merchandise information registration module, advertisement information registration module, catalogue information registration module, and association information registration module. In addition, the module set 177 includes a batch registration module for various data (catalogue information and association information), various maintenance modules, and a merchandise information catalogue output module.

These modules are loaded into the memory in the server PC 161 to execute processes in response to a request from the client PC 152.

Separately from these modules, the server PC 161 comprises an editing module 178 including an image editing module for editing an image such as a PDF file by using a layout engine, and a file editing module for performing editing such as merging/division for a data file. The editing module 178 is implemented by, e.g., the layout editing application 121.

Further, the server PC 161 comprises a database-shared library 180 for exchanging data with a database 179 (corresponding to the database 119 in FIGS. 1A and 1C) in the server PC 161, and a utility library 181 for implementing various functions.

An example of the configuration of the image forming apparatus 109 will be explained with reference to FIG. 2A.

Figure 2A:
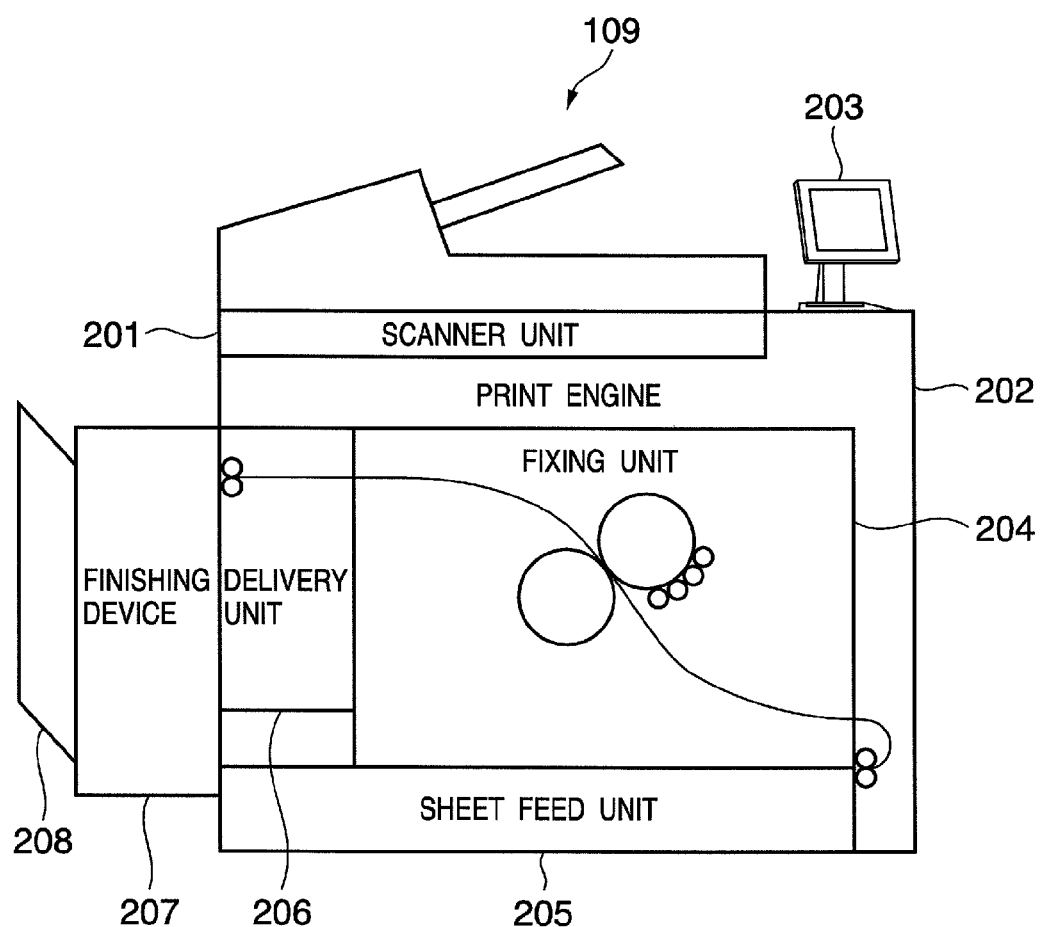
FIG. 2A is a view showing a detailed configuration of an image forming apparatus according to the embodiment of the present invention.

FIG. 2A is a view showing a detailed configuration of the image forming apparatus according to the embodiment of the present invention.

The image forming apparatus 109 comprises a scanner unit 201, a print engine 202, a control unit 203 which is controlled by a touch panel, a fixing unit 204, a sheet feed unit 205, a delivery unit 206, a finishing device 207, and a bin 208 at which delivered paper sheets are stocked. With these building components, the image forming apparatus 109 functions as an MFP (Multi Function Peripheral) which implements a plurality of types of functions such as a copying function, printing function, FAX function, and data transfer function. Note that the scanner unit 201 has an auto document feeder (ADF).

In the image forming apparatus 109, the scanner unit 201 scans a document on the basis of an operation from the control unit 203, and the print engine 202 executes a printing process in a designated printing mode. A printed material as a result of printing on a printing sheet by the printing process is delivered from the delivery unit 206. If necessary, the printed material undergoes a finishing process (stapling, punching, or the like) by the finishing device 207, and is output to the delivery bin 208.

A functional configuration implemented by the control unit 203 will be explained with reference to FIG. 2B.

Figure 2B:
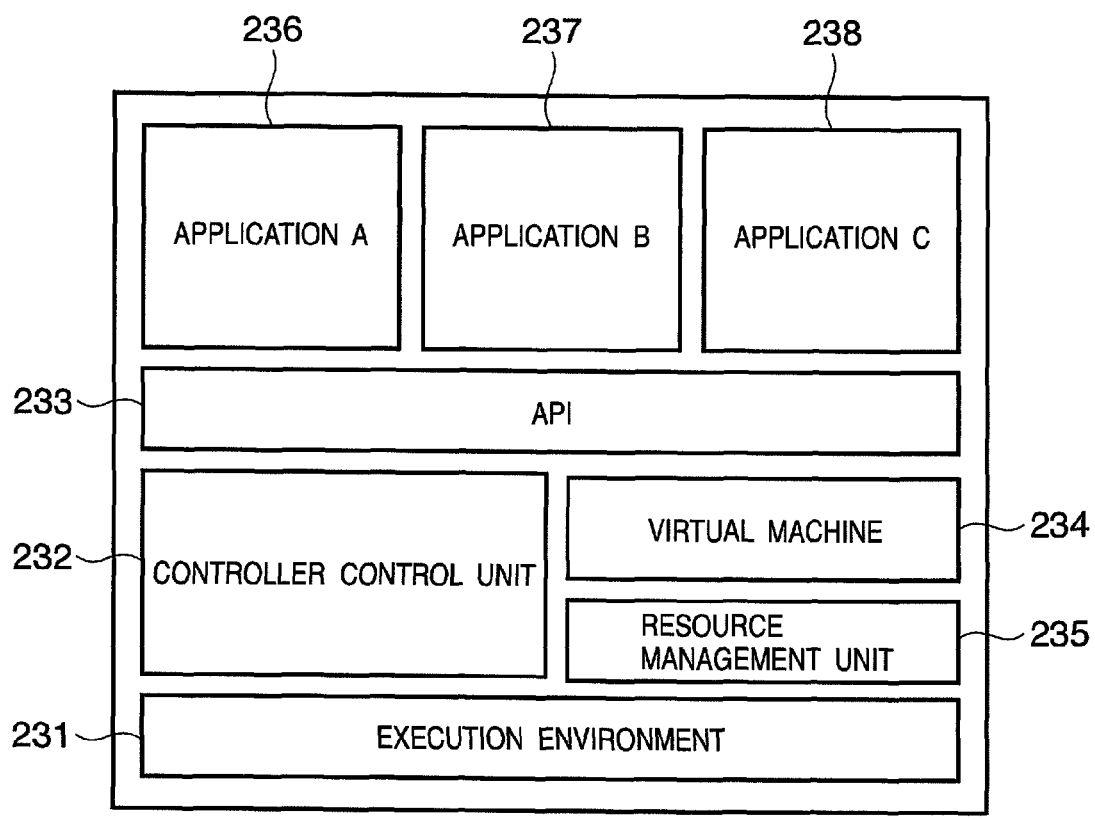
FIG. 2B is a block diagram showing the functional configuration of a control unit according to the embodiment of the present invention.

FIG. 2B is a block diagram showing the functional configuration of the control unit according to the embodiment of the present invention.

Note that the control unit 203 has a CPU which controls the image forming apparatus 109, a RAM which is used to store various data and functions as a data work area, and a ROM which stores various programs including a control program for implementing processes of the embodiment.

Reference numeral 231 denotes an execution environment of the present invention in which the overall image forming apparatus 109 is controlled. The execution environment 231 is implemented by, e.g., each module of a real-time OS capable of controlling various functions of the image forming apparatus 109 in real time. The execution environment 231 may also be implemented by libraries which can instruct the CPU to critically control functions including the optional device and expansion card of the image forming apparatus 109. Further, the execution environment 231 is implemented by modules which provide interface commands to an application running on an upper layer.

Reference numeral 232 denotes a controller control unit which runs in the execution environment 231. Reference numeral 233 denotes an application programming interface (to be referred to as an API hereinafter). The API 233 has a function of executing a process to access the controller control unit 232, and transmitting a control command to the image forming apparatus 109 in response to the instruction sequences of instruction inputs from applications 236 to 238 and the like.

Reference numeral 234 denotes an execution environment optimal for executing a specific application which implements processes described in the embodiment. The execution environment 234 is implemented by, e.g., a Java® virtual machine. The applications 236, 237, and 238 run on the virtual machine, and request various processes of the controller control unit 232 by using the API 233. The applications 236, 237, and 238 can also communicate with various information processing apparatuses 161 and 152 to 154 (FIG. 1D) via the network 107.

Reference numeral 235 denotes a resource management unit which manages resources used by the virtual machine 234 and runs in the execution environment 231. The resource management unit 235 limits the use of more than predetermined resources when the virtual machine 234 itself, the API 233, or all the applications 236 to 238 on the virtual machine 234 use resources such as a memory.

<Outline of Layout Editing Application>

An outline of variable data printing will be explained with reference to FIG. 3A.

FIG. 3A is a view for explaining an outline of variable data printing according to the embodiment of the present invention.

A plurality of containers 181 to 183 are laid out on a page in accordance with an operation instruction from the user via the user interface 103 of the layout editing application 121. Constraints on position and size are assigned to the containers via the user interface 103 to generate a document template 180.

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 to 183 of the document template 180 in accordance with a print instruction or preview instruction from the user. The layout engine 105 flows the data of each record into the containers (e.g., flows data fields A to C of data record 1 into the containers 181 to 183). The layout engine 105 adjusts (adjusts the layout) the size of each container and the like in accordance with the flowed data.

For a preview instruction, the layout engine 105 generates a layout-adjusted document image, and outputs it on the screen of the display device 144 so as to display the image as a preview. For a print instruction, the layout engine 105 outputs, as print data to the image forming apparatus 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3B.

[Main Window]

Figure 3B:
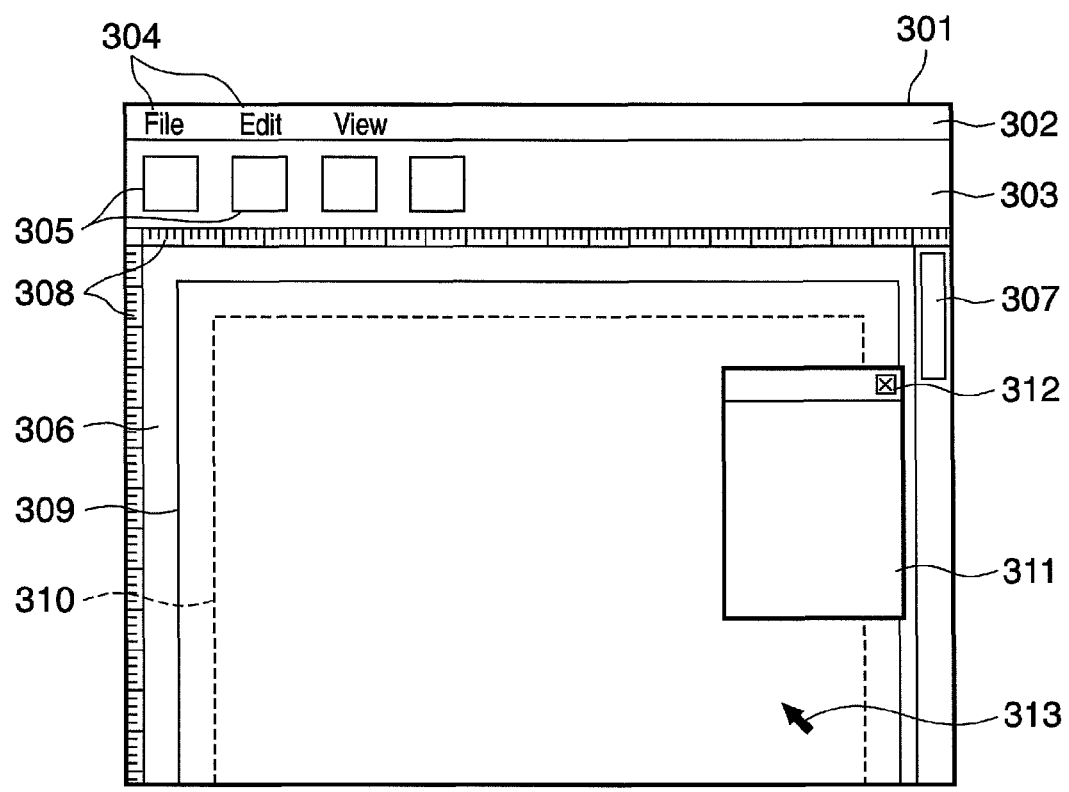
FIG. 3B is a view showing an example of a user interface according to the embodiment of the present invention.

FIG. 3B is a view showing an example of the user interface according to the embodiment of the present invention.

As shown in FIG. 3B, the user interface 103 displays on the display device 144 a user interface which is formed by an application window 301 upon operation. The application window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

Figure 4:
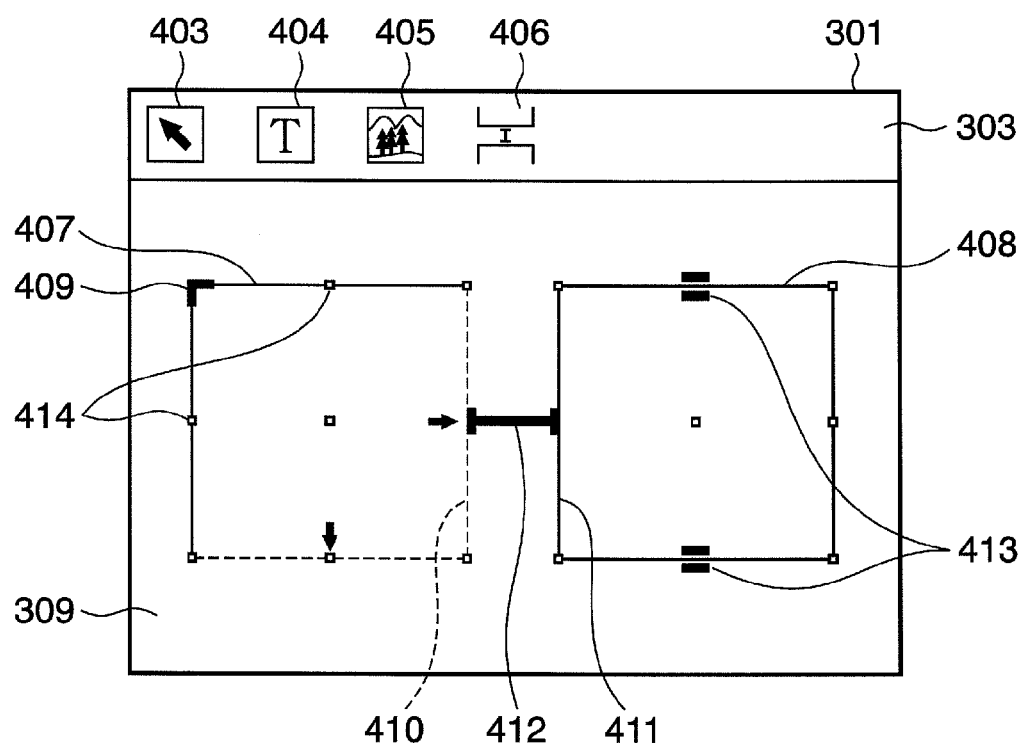
FIG. 4 is a view showing an example of display of a container in the user interface according to the embodiment of the present invention.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can determine a basic layout by laying out containers and links in a page. The basic layout is a layout serving as a base for variable data printing. When each container in the basic layout is a fixed layout, the print results of all records have the same layout.

When each container in the basic layout is a flexible container (to be described later), the size and position of the container change in accordance with the amount and size of data loaded from each record under constraints (to be described later).

Hence, a document template created by the layout editing application 121 determines only the basic layout. When the document template contains a dynamic container, the layout of a finally printed material is adjusted in accordance with loaded data.

A container whose size and position are fixed will be called a static container in comparison with the dynamic layout.

[Document Template]

In FIG. 3B, the work area 306 is used to display and edit the design of the document template (180: basic layout). The work area 306 can present an outline of a document to be printed to the user while the user designs a document template. From the outline of the document, the user can easily understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 3A.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on variable data in an associated data source. In this case, a field which changes in size depending on the variable data amount, like a dynamic table, is set in the document template. That is, in this case, an additional page is automatically created upon loading variable data which cannot fit variable data in one page.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. The anchor icon 409 shows that the container can be enlarged to the right or down when variable data is flowed into the container 407 and the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container. Although details of the link 412 will be described later, the link 412 represents that the containers 407 and 408 are associated. The link 412 also represents that the container 408 can be moved to the right while maintaining a length (range can be specified) set for the link 412. The slider 413 shows that it can be moved parallel to an edge at which the slider 413 is set.

[Container]

A container will be explained as a field area for inserting data of a plurality of types of data fields contained in each record in the database. The container is a field area (to be referred to as a partial area) where a fixed or flexible text and image (data of a plurality of types of data fields) are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has a set of settings, visual representation, interaction, and editing operation. The definition of the container in the embodiment will be described.

(1) A container has fixed or flexible contents.

Flexible contents (variable data) can be said to be dynamic in a sense that data acquired from the data source may change for each document, i.e., each record. Note that flexible contents in the embodiment are not intended to be animated contents or contents which change over time by another method because these contents are not suitable for printing.

Similarly, fixed contents are displayed identically for all documents generated using containers. When, however, a link to flexible contents is set, fixed contents may change in position in each document under the influence of the flexible contents.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container. Other examples are an overwrite count representing container operation when a container is merged with data from the data source, a line, an icon, and a text.

[Container Constraints]

The container has constrains on controlling how to link contents displayed in each document. These constraints (including linking of fixed/flexible contents to a container) are a major method of controlling generation of many documents from one document template by the user.

An example of the constraints is "the height of contents in this container is 4 inches at maximum". Another example of the constraints is "the left edge of contents in the container must be displayed at the same horizontal position in respective documents". The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in an area in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, a term "fixed" which defines a given value used to constrain display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the display position of associated contents is defined such that the horizontal position of the left edge is identical in all documents. However, the contents may be displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the nearest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When the corner position of a container, the intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial area). The user can create a desired basic layout when he determines the basic layout of the document template 180.

[Display and Editing of Container]

—Method of Creating New Container—

A container is described as either of two, text and image containers. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container). The layout editing application 121 further uses a handle 502 (control point drawn on or near the edge of an area for movement and modification), the slider 413 (short parallel lines drawn on the two sides of an edge: see FIG. 4), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible edge is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted to draw lines.

The place at which a flexible edge is drawn depends on the contents of a container. As will be described later, a "dynamic calibration process" is employed which means that contents are merged into a document template and visualized on a user interface. Alternate execution can be achieved by another means for determining where a flexible edge is laid out in a user interface or in the content area of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container are assistance to design a document template, and are not drawn on a printed material.

As described above, settings of a basic pattern such as the reference, minimum, and maximum values of the width and height of a container are displayed in a secondary dialog window.

Figure 5A:
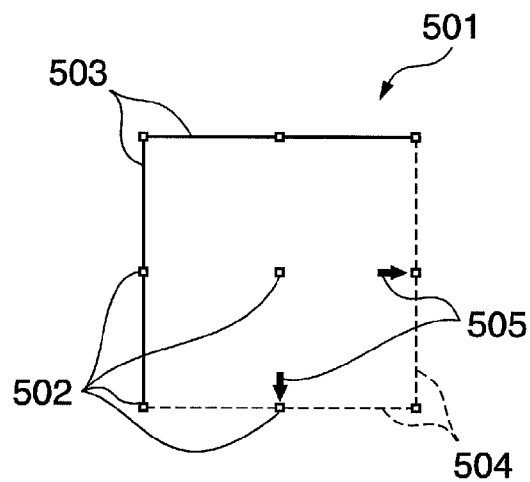
FIGS. 5A to 5D are views for explaining container display rules according to the embodiment of the present invention.

In FIG. 5A, both the width and height of a container 501 are not fixed (are flexible). A fixed edge 503 is represented in a solid line, and a flexible edge 504 is represented in a dotted line. A scaling icon 505 exhibits that the adjacent edge 504 is flexible. An indicator in another form may also be used instead or additionally.

Figure 5B:
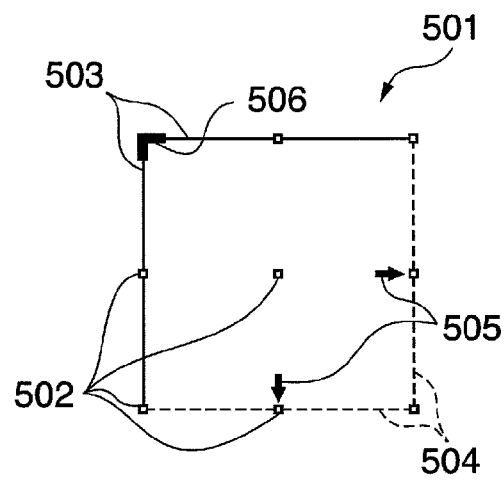

In FIG. 5B, both the width and height of the container 501 are flexible. An anchor icon 506 is so added as to explicitly represent that the corner position between two crossing edges 503 is fixed.

Figure 5C:
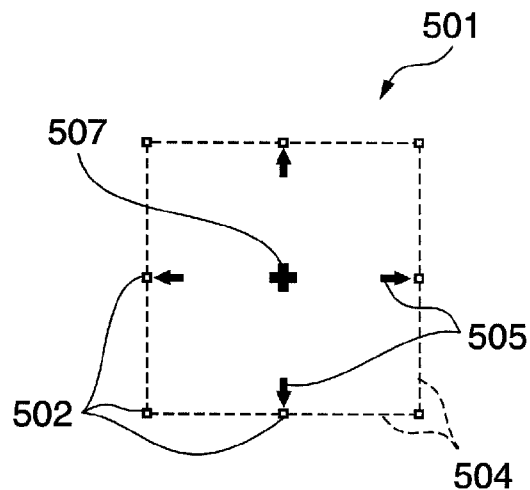

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

Figure 5D:
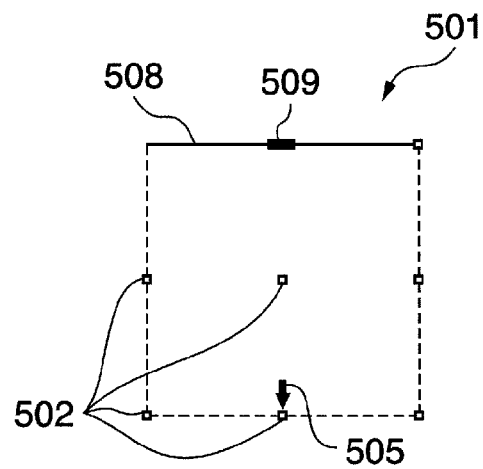

In FIG. 5D, an upper edge 508 of the container 501 is fixed, but both the width and height are flexible. The anchor icon 509 positioned at the center of the upper edge 508 is fixed. The left and right edges (502) of the container 501 pass the anchor icon 509 and move apart from or close to the vertical center axis (vertical axis).

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
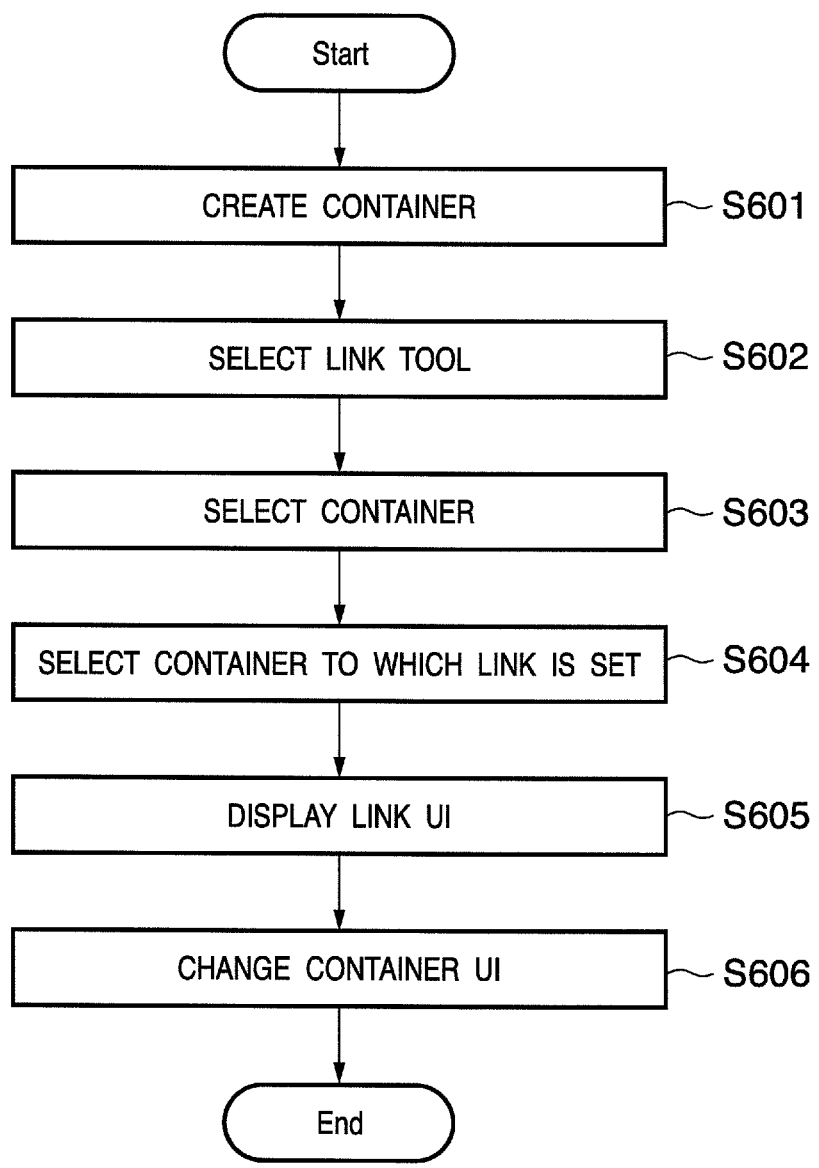
FIG. 6 is a flowchart showing a link setting process according to the embodiment of the present invention.
Figure 7A:
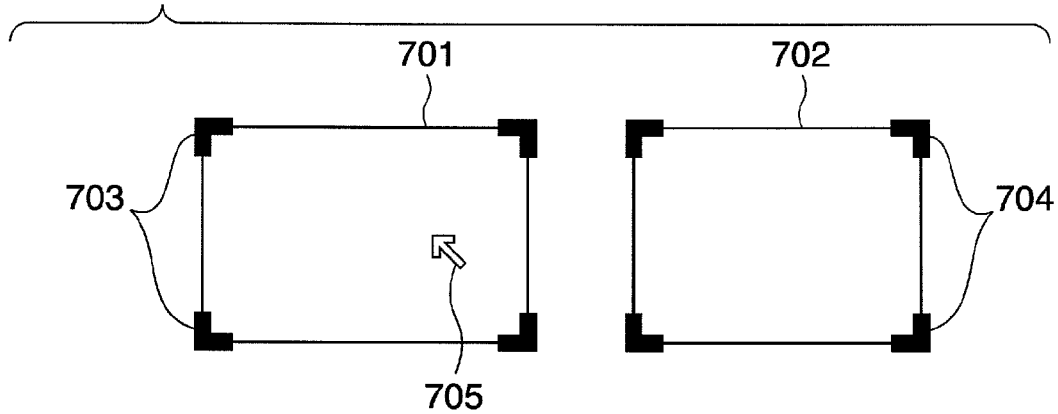
FIGS. 7A to 7C are views showing an example of transition of the user interface in setting a link according to the embodiment of the present invention.
Figure 7B:
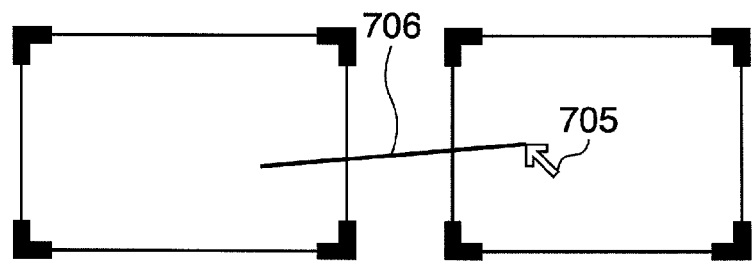
Figure 7C:
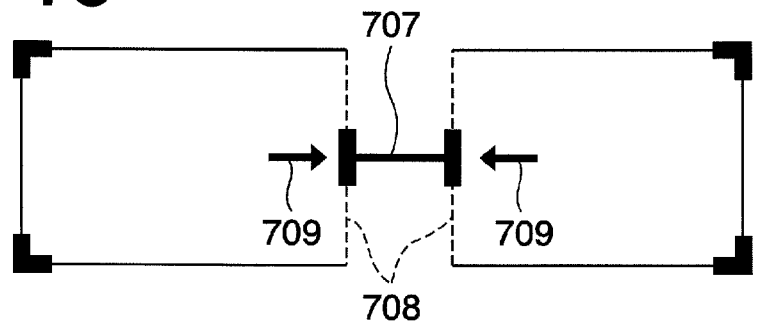

FIG. 6 is a flowchart showing a link setting process according to the embodiment of the present invention. FIGS. 7A to 7C are views showing an example of transition of a user interface in setting a link according to the embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7B exhibits a line which connects a click position in the state of FIG. 7A and the current position of the mouse pointer 705. This UI can present the user with a position at which a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>
[Layout Calculation Method (Overall Flow)]

The layout editing application 121 according to the embodiment has at least two operation modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
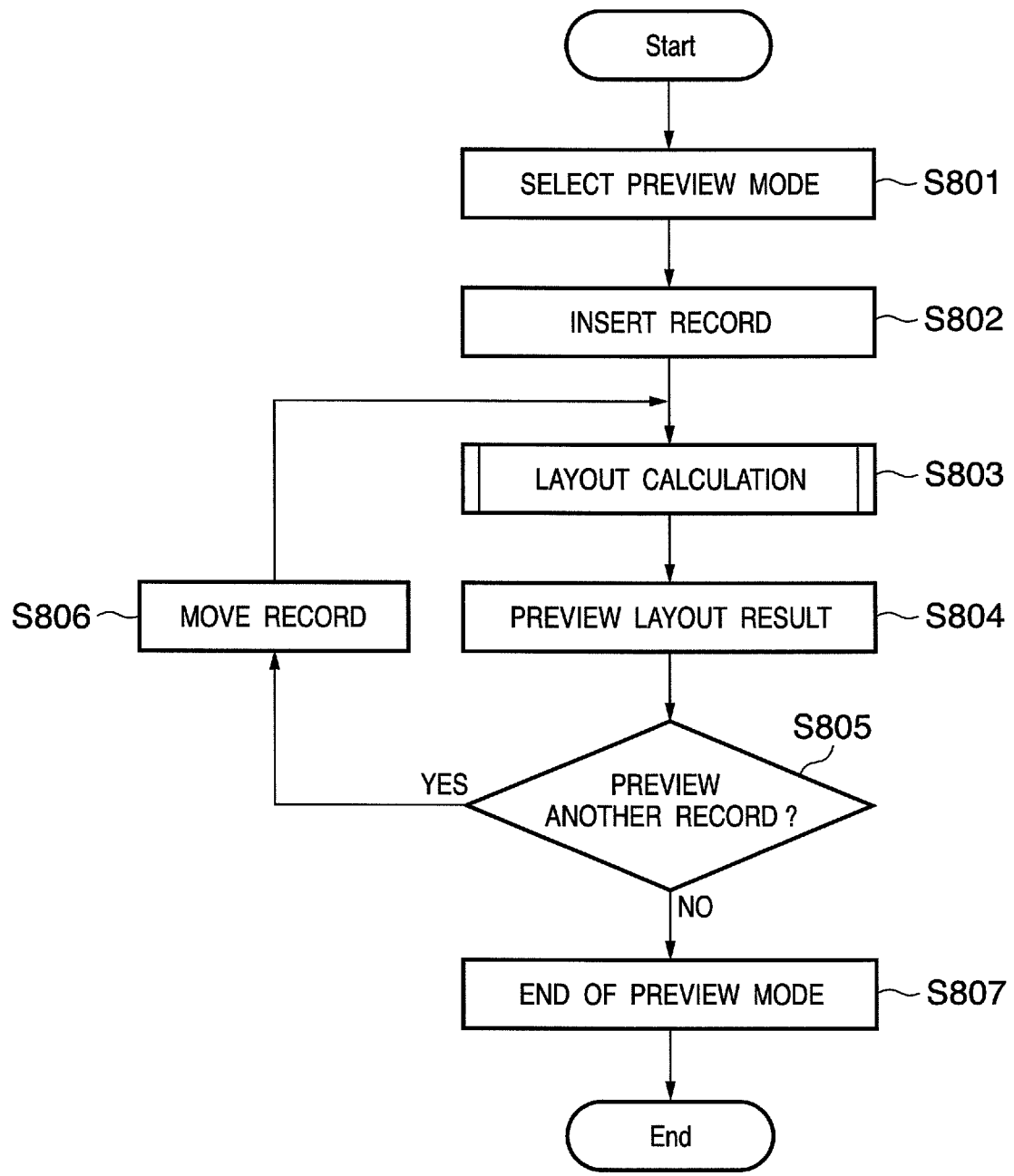
FIG. 8 is a flowchart showing a layout calculation process according to the embodiment of the present invention.

FIG. 8 is a flowchart showing the layout calculation process according to the embodiment of the present invention.

The preview mode is selected (step S801). In the preview mode, the layout editing application 121 prompts the user to select a record to be previewed from the data source, and inserts each field data of the selected record into each container (step S802).

After the field data is inserted into each container, the layout editing application 121 executes layout calculation for laying out the record, and if necessary, adjusts the layout (step S803). Details of layout calculation in step S803 will be described later.

The layout editing application 121 displays (previews) the layout calculated in step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In printing, unlike the preview mode, layout calculation is sequentially performed for all records to be printed. In printing, therefore, step S804 is omitted, and whether all records to be printed have been processed is determined in step S805. In step S803, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
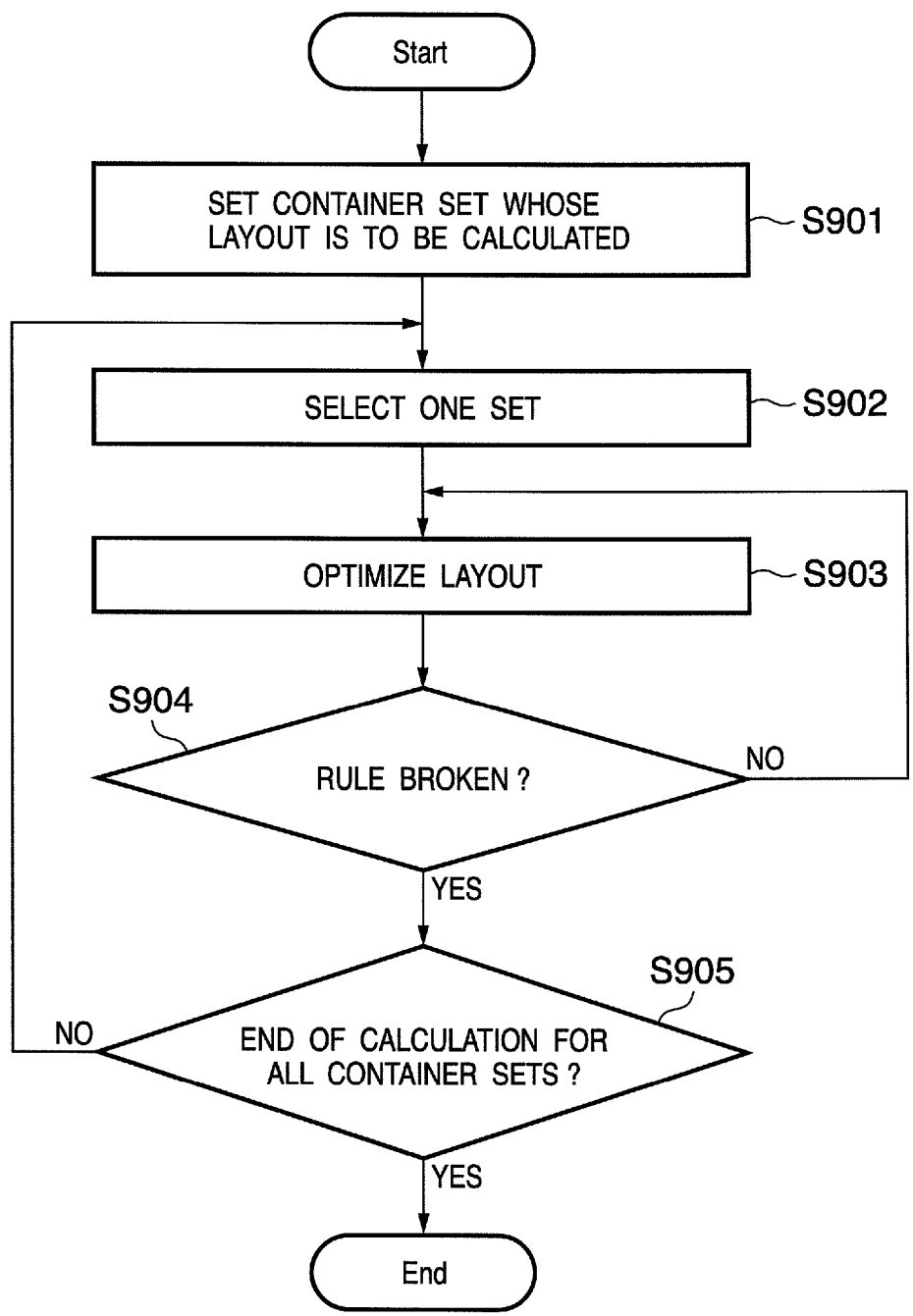
FIG. 9 is a flowchart showing details of the layout calculation process according to the embodiment of the present invention.

FIG. 9 is a flowchart showing details of the layout calculation process according to the embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets a set of containers whose layout is to be calculated (step S901). Layout calculation is done for associated containers as one set.

Figure 10:
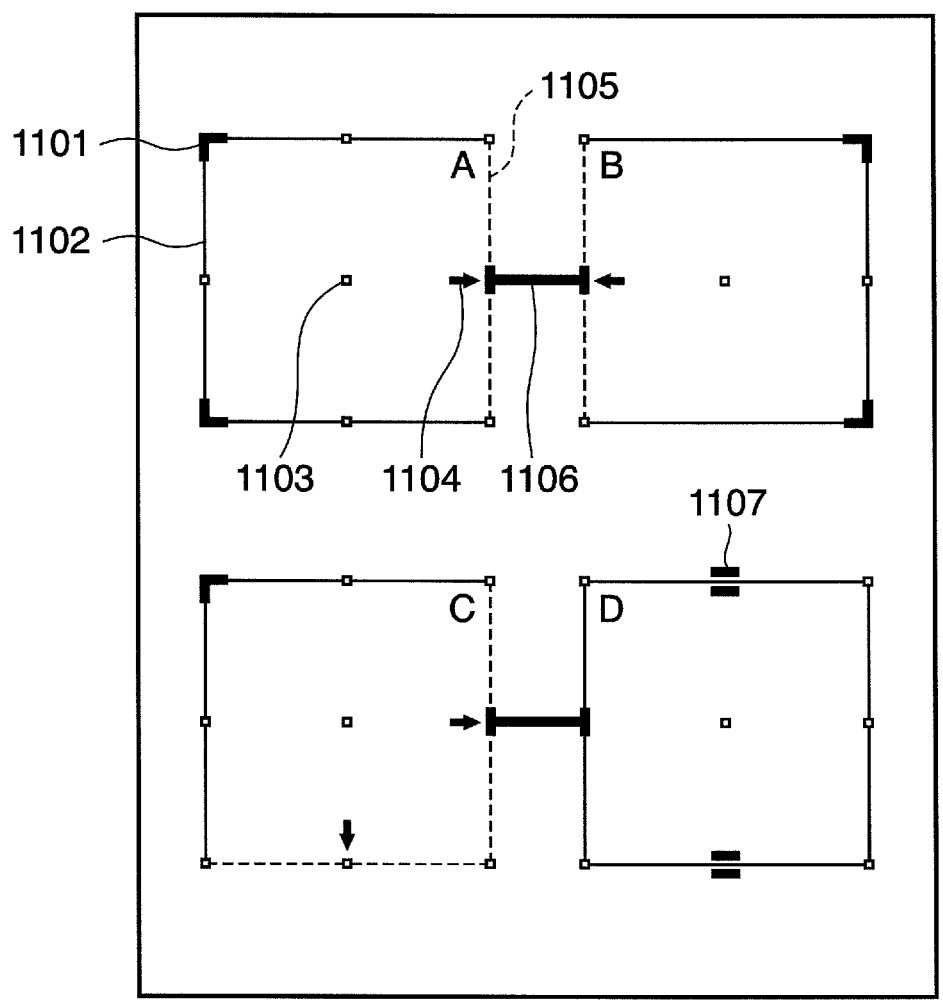
FIG. 10 is a view for explaining a set of containers in the layout calculation process according to the embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes designated by the container attributes of container A. The character attributes are, e.g., the font type, font size, character pitch, and line pitch.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout breaks the rules (step S904). If the layout does not break rules (YES in step S904), the process advances to step S905. If the layout breaks the rules (NO in step S904), the process returns to step S903 to calculate the layout again so as not to break the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to break the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 11C.

Figure 11A:
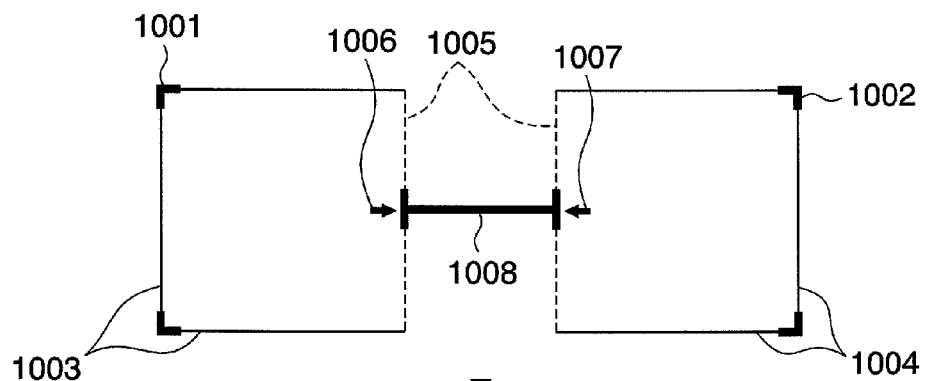
FIG. 11A to 11C are views showing an example of the user interface in the layout calculation process according to the embodiment of the present invention.
Figure 11B:
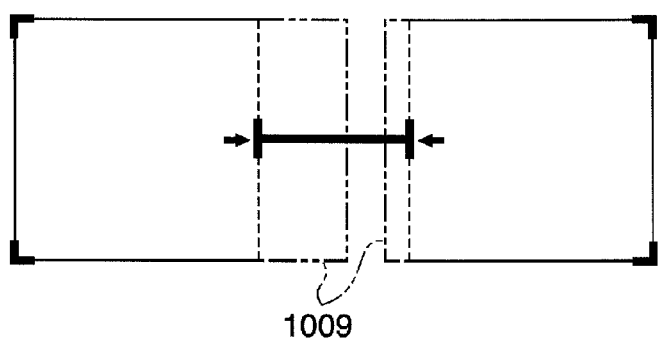
Figure 11C:
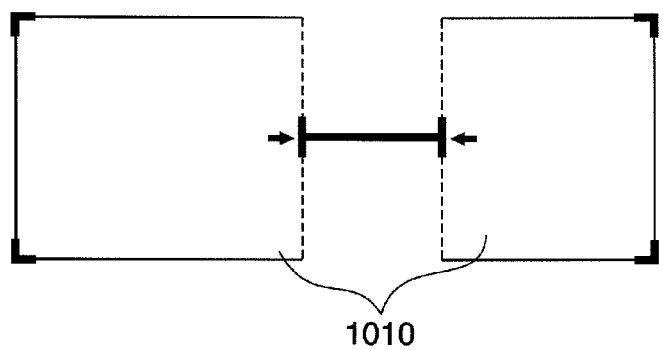

FIGS. 11A to 11C are views showing an example of a user interface in the layout calculation process according to the embodiment of the present invention.

FIG. 11A shows a state in which a given record is inserted and the layout is determined. Reference numerals 1001 and 1002 denote anchors; 1003 and 1004, fixed edges; 1005, a flexible edge; 1006, an arrow indicating a direction in which a flexible edge changes; and 1008, a link. In this state, a record is changed, and contents of different sizes are inserted.

FIG. 11B shows the size of new contents over the state of FIG. 11A. Reference numeral 1009 denotes a size of contents which are inserted into each container. After that, the layout is calculated.

FIG. 11C shows the result of layout calculation. The size of each container after calculation is so calculated as to have a difference equal to that of the size of contents to be actually inserted, and not to break the above-mentioned rules. As shown in FIG. 11C, the inserted-content size 1009 shown in FIG. 11B and a calculated content size 1010 have the same difference.

[Setting of Flexible Link]

Figure 12:
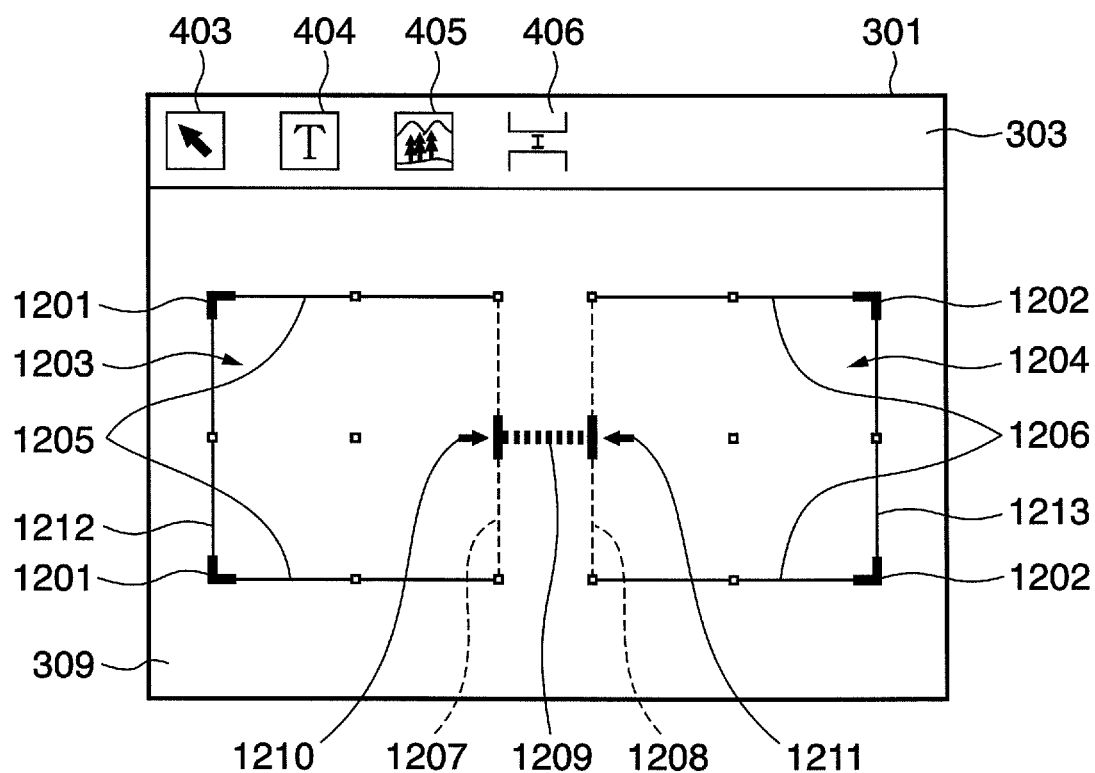
FIG. 12 is a view showing an example of a user interface for setting a flexible link according to the embodiment of the present invention.

FIG. 12 is a view showing an example of a user interface for setting a flexible link according to the embodiment of the present invention.

In FIG. 12, similar to FIG. 4, the application window 301 and tool bar 303 are configured. In the state of FIG. 12, containers 1203 and 1204 exist on the document template 309. The container 1203 includes anchor icons 1201 and fixed edges 1205, whereas the container 1204 includes anchor icons 1202 and fixed edges 1206.

A flexible-size link 1209 is set between the containers 1203 and 1204 to link them. Since the link 1209 is set between the containers 1203 and 1204, a right edge 1207 of the container 1203 and a left edge 1208 of the container 1204 are represented in broken lines. Indicators 1210 and 1211 are displayed on the respective containers to represent that the edges 1207 and 1208 are flexible.

Figure 13:
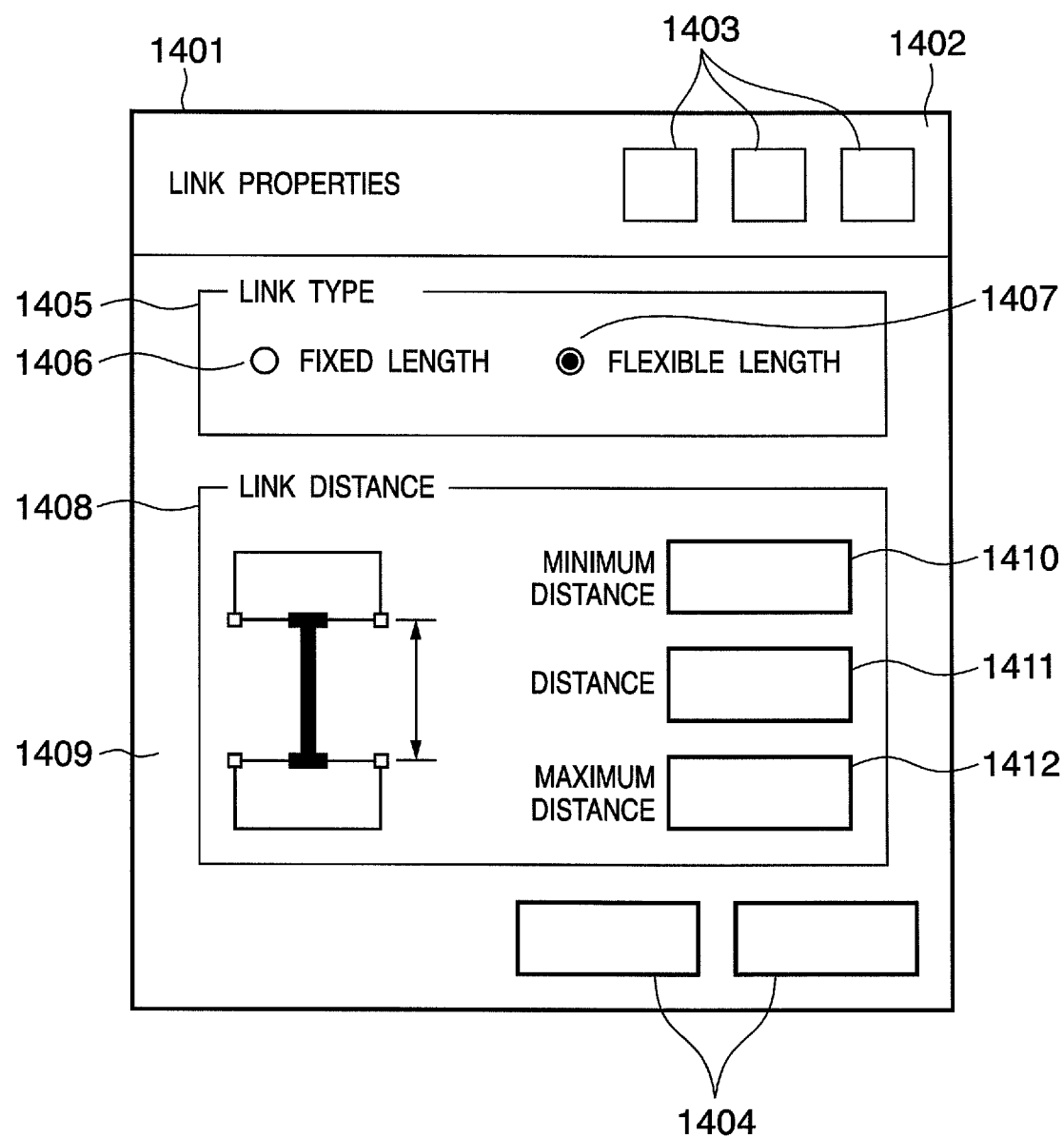
FIG. 13 is a view showing an example of a user interface for implementing a link setting function according to the embodiment of the present invention.

FIG. 13 is a view showing an example of a user interface for implementing a link setting function according to the embodiment of the present invention.

FIG. 13 shows an example of a dialog window 1401 for setting information on the link 1209. The dialog window 1401 is made up of a title bar 1402, tool buttons 1403, a button 1404 for opening/closing the dialog window 1401, and an area 1409 for setting various pieces of information.

The dialog window 1401 has a link type field 1405 made up of radio buttons for alternatively selecting whether the link type is a link of a flexible length (1407) or that of a fixed length (1406).

When the link type is a flexible-length link, a link distance field 1408 is formed from a minimum value field 1410 (minimum distance), maximum value field 1412 (maximum distance), and reference value field 1411 for the link length.

The dialog window 1401 in FIG. 13 is displayed when a link is set between two containers by, e.g., the link setting operation described with reference to FIGS. 6 and 7A to 7C, and then the set link is selected by an operation such as clicking. Alternatively, immediately after a link is set, the dialog window 1401 relevant to the link may be automatically displayed. The reference value of the reference value field 1411 for the distance between containers is a link length used when the size of each container does not change upon flowing data into it.

A flexible link setting method will be explained with reference to FIG. 14.

Figure 14:
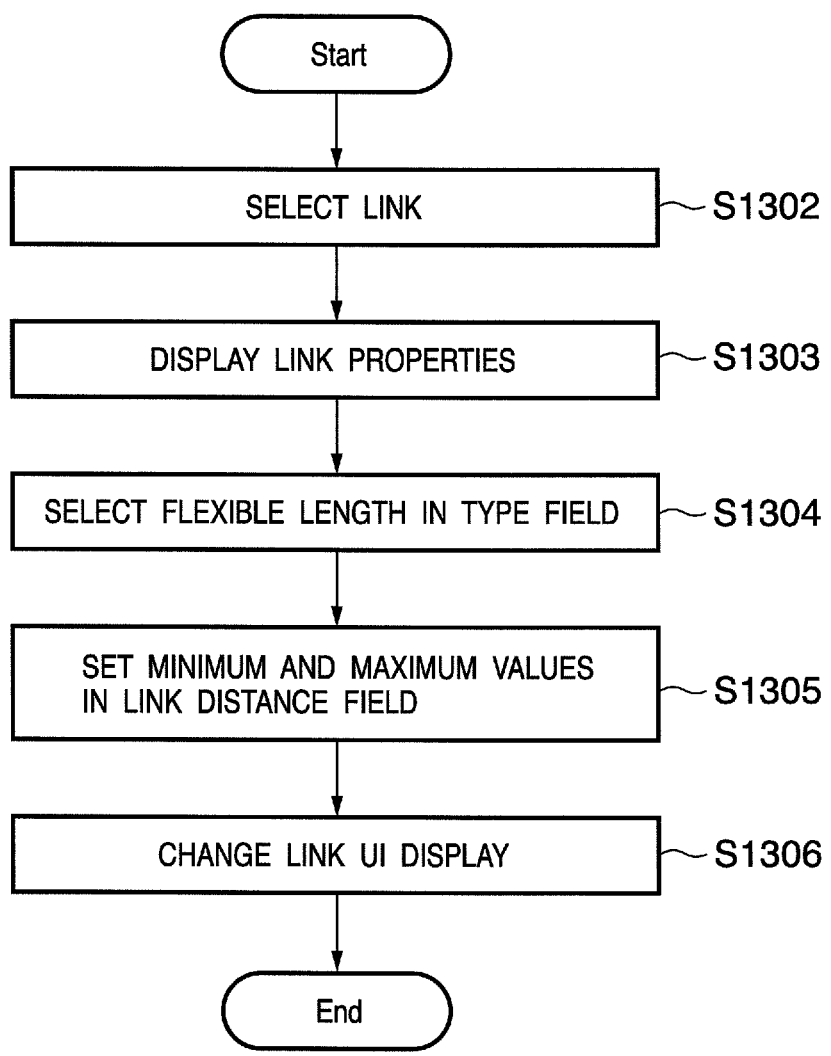
FIG. 14 is a flowchart showing a flexible link setting process according to the embodiment of the present invention.

FIG. 14 is a flowchart showing a flexible link setting process according to the embodiment of the present invention.

For example, when a link is set between two containers A and B in FIG. 10 by the link setting operation described with reference to FIGS. 6 and 7A to 7C, a link of a fixed size is set. By selecting this link and executing the process shown in FIG. 14, the link can be changed from the fixed-size link 1106 (FIG. 10) to the flexible-size link 1209 (FIG. 12).

First, a desired link (e.g., the link 1106 in FIG. 10) is selected with the mouse 133 (step S1302). Then, a predetermined operation to display link properties is performed. In response to this, the user interface 103 of the layout editing application 121 displays the dialog window 1401 (FIG. 13) corresponding to the selected link (to be referred to as a target link hereinafter) (step S1303).

Note that the link selection operation is an arbitrary one such as right clicking of the mouse 133 or an operation to a specific key of the keyboard 132, similar to the setting of the basic pattern of a container.

The displayed dialog window 1401 presents the current state of the selected link. In this example, since the link 1106 is selected, the link size is fixed in this stage, and the distance 1406 representing a fixed length is selected in the link type field 1405.

In order to change the link from a fixed size to a flexible one in the dialog window 1401, the flexible length button 1407 is selected in the link type field 1405 to set the link size flexible (step S1304).

In response to this selection, the maximum distance field 1412, minimum distance field 1410, and reference value field 1411 arranged in the link distance field 1408 are enabled to allow setting numerical values. In order to set a flexible size of the link, the user sets the maximum value of the link length in the maximum distance field 1412, the minimum value in the minimum distance field 1410, and the current value in the reference value field 1411 (step S1305).

After the end of the settings, the user designates application of the settings with the general dialog window opening/closing button 1404. When the user interface 103 detects this designation, it reflects the setting state on the target link. As a result, the link UI display changes to a state as represented by the link 1209 in FIG. 12 (step S1306).

The setting information in the dialog window 1401 is stored in, e.g., the memory 136.

An example of a layout result will be explained with reference to FIGS. 15 and 16.

Figure 15:
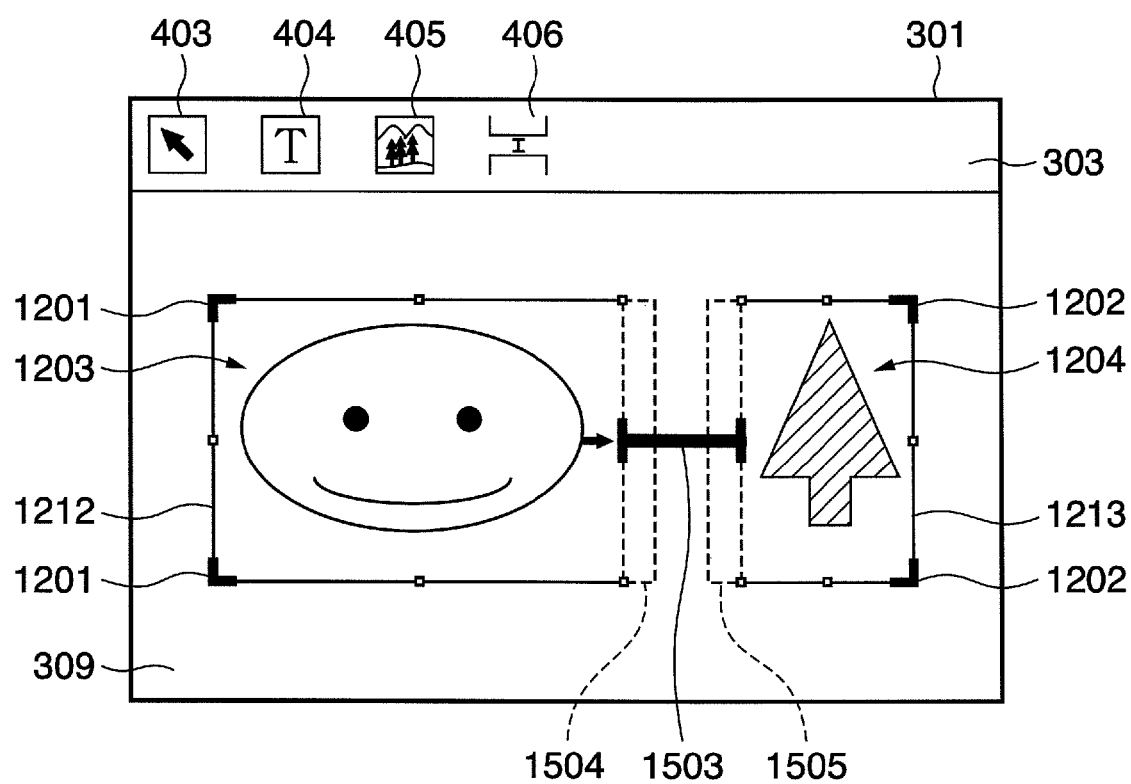
FIG. 15 is a view showing a layout result when a fixed-size link is used according to the embodiment of the present invention.

FIG. 15 is a view showing a layout result when a fixed-size link is used according to the embodiment of the present invention.

The layout is calculated by the same method as that described above. For example, assume that image data of different sizes are inserted into the containers 1203 and 1204 shown in FIG. 12. In this case, the respective containers regard data sizes to be optimal. The container 1203 is to change its size to the right so as to move close to a frame 1504 (optimal container size) corresponding to the size of the inserted image. Similarly, the container 1204 is to change its size to the left so as to move close to a frame 1505 (optimal container size) corresponding to the size of the inserted image.

However, a left edge 1212 of the container 1203 and a right edge 1213 of the container 1204 cannot move owing to the anchors 1201 and 1202. To change the sizes of the containers 1203 and 1204, the interval between them must be decreased. However, a fixed-size link 1503 is set between the containers 1203 and 1204, and the length of the fixed-size link 1503 is maintained in layout calculation. Thus, the sizes of the containers 1203 and 1204 are changed.

As a result, the containers 1203 and 1204 cannot ensure sizes each optimal for the aspect ratio of data, and finally become smaller than the optimal sizes (frames 1504 and 1505), as shown in FIG. 15. In other words, since the size of the link 1503 is fixed, the containers 1204 and 1203 cannot achieve their optimal sizes (in FIG. 15, the range indicated by a chain line in each container exhibits the aspect ratio of data).

Figure 16:
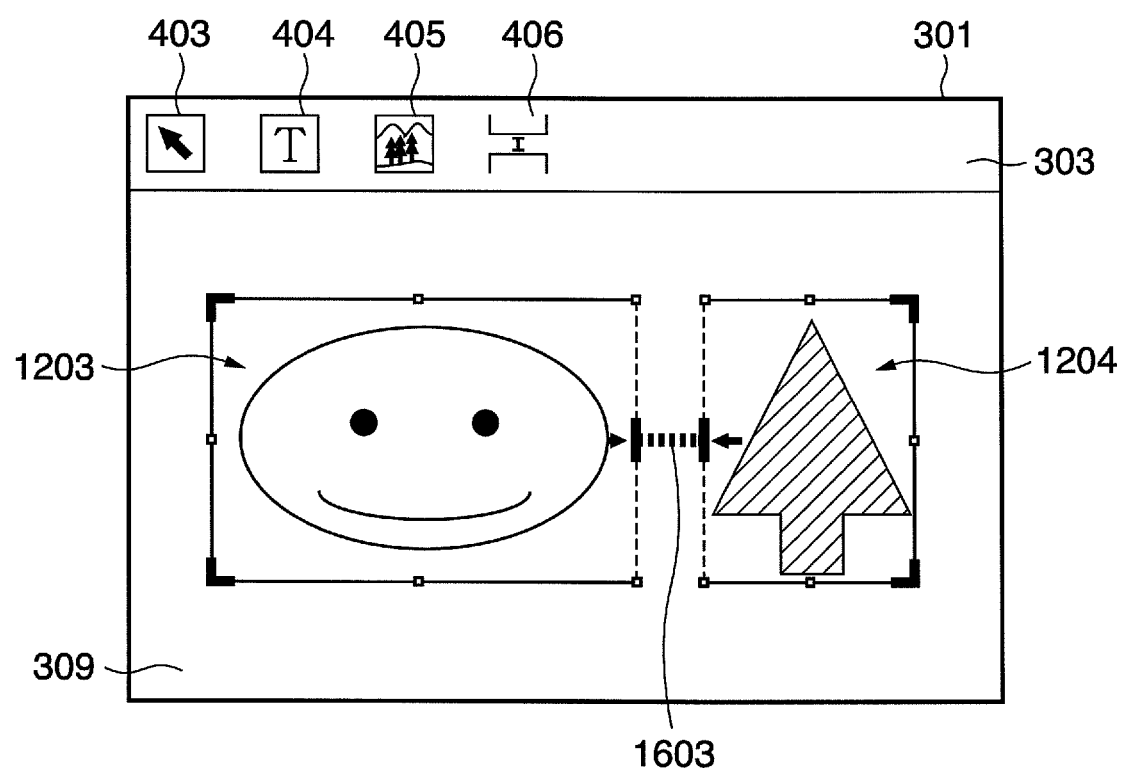
FIG. 16 is a view showing a layout result when a flexible-size link is used according to the embodiment of the present invention.

FIG. 16 shows a layout result when the link is set to a flexible size in the same state as that in FIG. 15.

In this case, as shown in FIG. 16, a flexible-size link 1603 is set between the containers 1203 and 1204 in the above example. In changing the sizes of the containers 1203 and 1204, the link size decreases to set the sizes of the containers 1203 and 1204 larger than those in the example of FIG. 15.

Hence, a size optimal for the size of inserted data can be achieved, or a container frame close to the size (optimal size) of inserted data can be set. FIG. 16 shows the result of this layout. The flexible link 1209 in FIG. 12 changes to a size represented by a flexible link 1603 as a result of layout calculation. In this case, the containers 1203 and 1204 attain optimal sizes (sizes corresponding to their data sizes).

The basic configuration serving as a premise of the present invention has been described.

A process when catalogue data having advertisement information field areas is output or previewed on a browser serving as a client will be explained.

[Document with Field Areas and Database]

Figure 17:
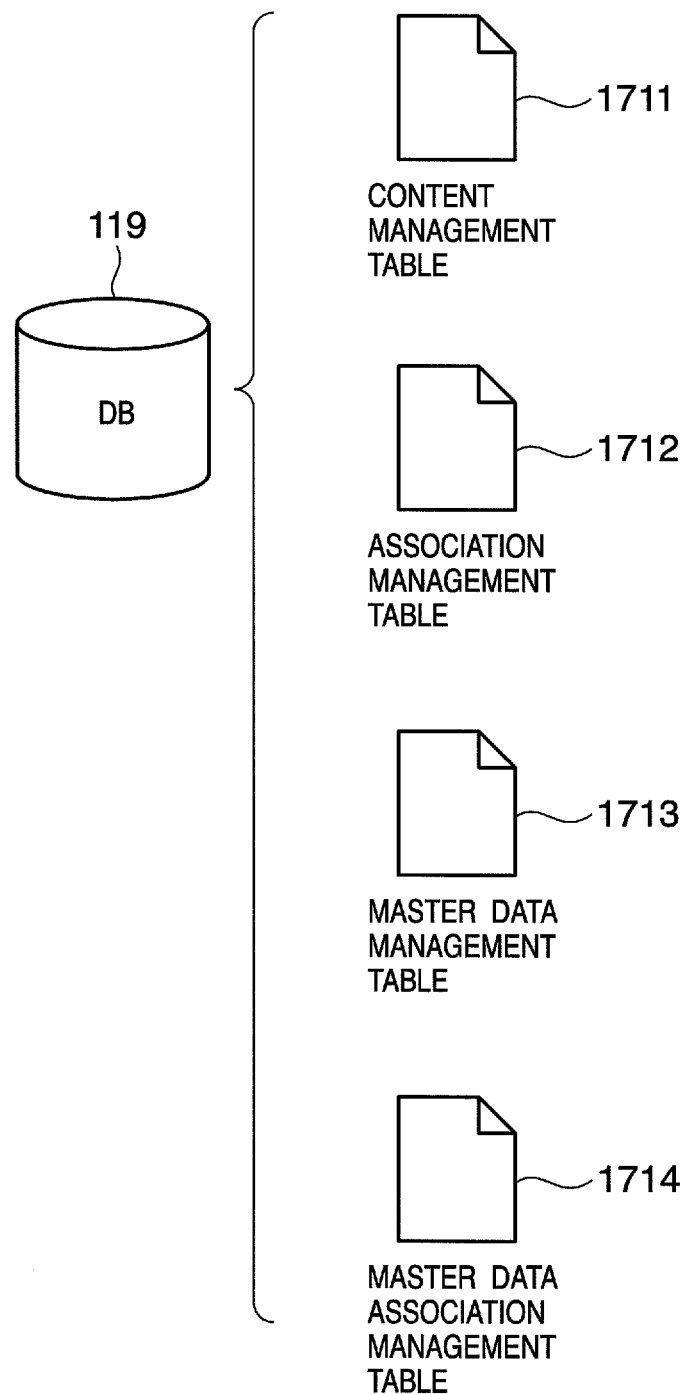
FIG. 17 is a view showing an example of the structure of a database in the information processing system according to the embodiment of the present invention.

FIG. 17 is a view showing an example of the structure of a database in the information processing system according to the embodiment of the present invention.

The database (DB) 119 comprises a content management table 1711 which manages access information for accessing content data (master data formed from various contents such as merchandise information and advertisement information). The database 119 also comprises a master data management table 1713 which manages master data formed from various contents such as merchandise information and advertisement information.

The database 119 comprises an association management table 1712 which manages information of association between the content management table 1711 and the master data management table 1713. The database 119 further comprises a master data association management table 1714 which associates merchandise information and advertisement information managed by the master data management table 1713.

The relationship between the database and a document (document template) having field areas according to the embodiment will be explained with reference to FIG. 18.

Figure 18:
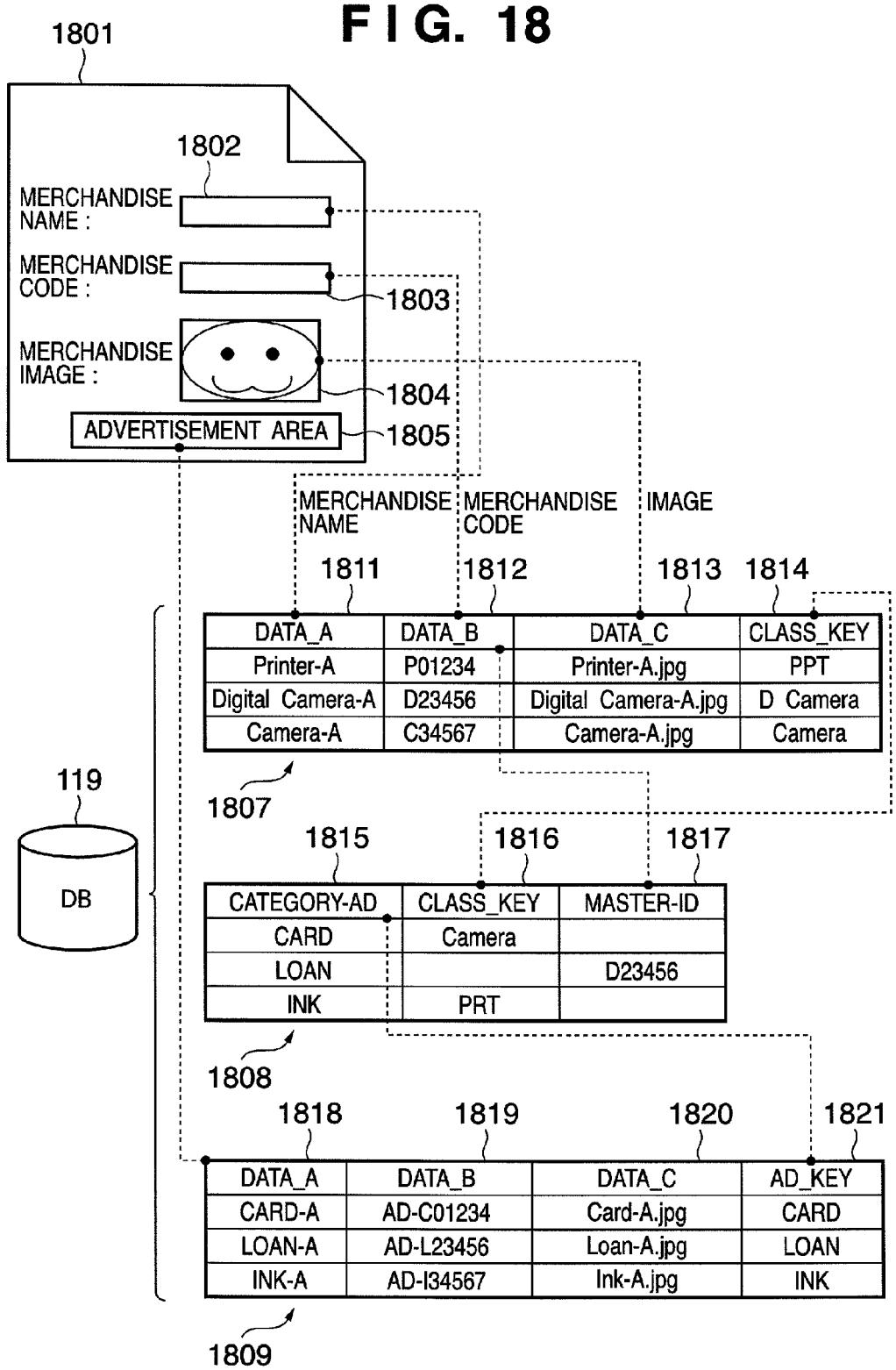
FIG. 18 is a view showing the relationship between the database and a document having field areas according to the embodiment of the present invention.

FIG. 18 is a view showing the relationship between the database and a document having field areas according to the embodiment of the present invention.

Reference numeral 1801 denotes an example of a document (document template) having at least a merchandise information field area and advertisement information field area as field areas. In this example, three field areas are formed as merchandise information field areas. More specifically, the merchandise information field areas are a field area 1802 for inserting "merchandise name" data as merchandise information, a field area 1803 for inserting "merchandise code" data, and a field area 1804 for inserting "merchandise image" data. The advertisement information field area is a field area 1805 (advertisement area) for inserting advertisement information.

The database 119 shown in FIG. 18 stores data for the field areas 1802 to 1805. The database 119 includes at least a merchandise information management table 1807, advertisement information management table 1809, and merchandise information-advertisement information association management table 1808.

The merchandise information management table 1807 and advertisement information management table 1809 are contained in the master data management table 1713 in FIG. 17. The merchandise information-advertisement information association management table 1808 is contained in the master data association management table 1714.

The merchandise information management table 1807 manages data to be inserted into the merchandise information field areas 1802 to 1804. The merchandise information field area 1802 is associated with a key 1811 (DATA_A); the merchandise information field area 1803, with a key 1812 (DATA_B); and the merchandise information field area 1804, with a key 1813 (DATA_C).

The advertisement information management table 1809 manages data to be inserted into the advertisement information field area 1805, and is made up of keys 1818 to 1821 and the like.

The merchandise information-advertisement information association management table 1808 associates the key 1821 of the advertisement information management table 1809 with the key 1812 or 1814 of the merchandise information management table 1807. That is, in FIG. 18, the merchandise information-advertisement information association management table 1808 associates an advertisement category key 1815 representing an advertisement category with a merchandise category key 1816 representing a merchandise category or a merchandise category key 1817 representing a merchandise code.

[Association between Merchandise Information and Advertisement Information]

In the embodiment, merchandise information and advertisement information serving as master data can be associated with each other via an operation window (to be described later). Several examples of the associated state will be explained.

Assume that merchandise information and advertisement information in the following description contain merchandise master data representing information on a piece of merchandise, and advertisement master data representing information on a single advertisement. Further, merchandise information and advertisement information contain a merchandise category representing a plurality of merchandise master data belonging to the same category, and an advertisement category representing a plurality of advertisement master data belonging to the same category.

Figure 19A:
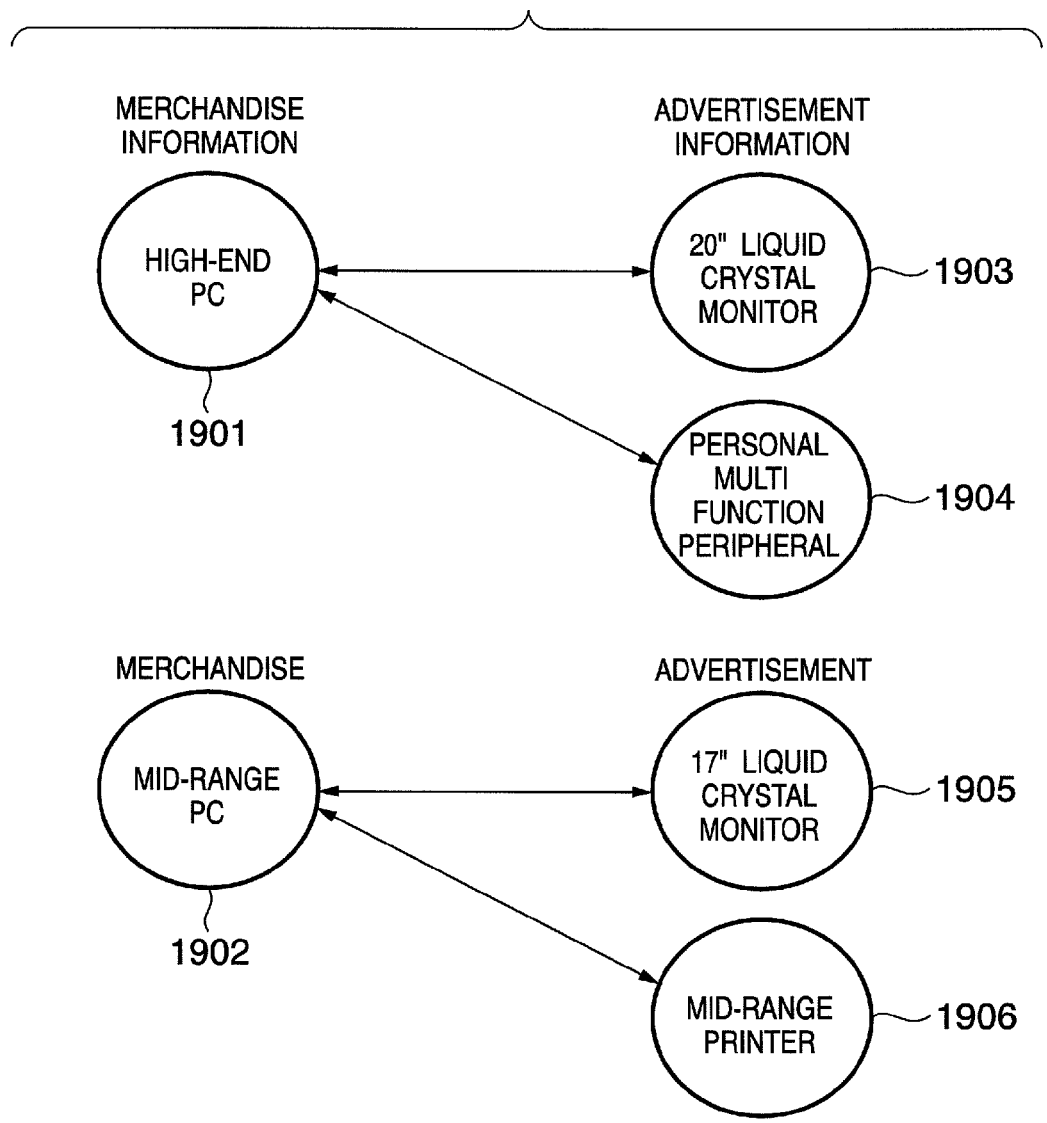
FIG. 19A is a view showing the associated state of merchandise master data and advertisement master data according to the embodiment of the present invention.

FIG. 19A is a view showing the associated state of merchandise master data and advertisement master data according to the embodiment of the present invention.

FIG. 19A shows that merchandise master data 1901 and 1902 can be associated with advertisement master data 1903 to 1906. The association can be established in two ways. For example, the association can be established from the merchandise master data 1901 to the advertisement master data 1903, and from the advertisement master data 1903 to the merchandise master data 1901.

Figure 19B:
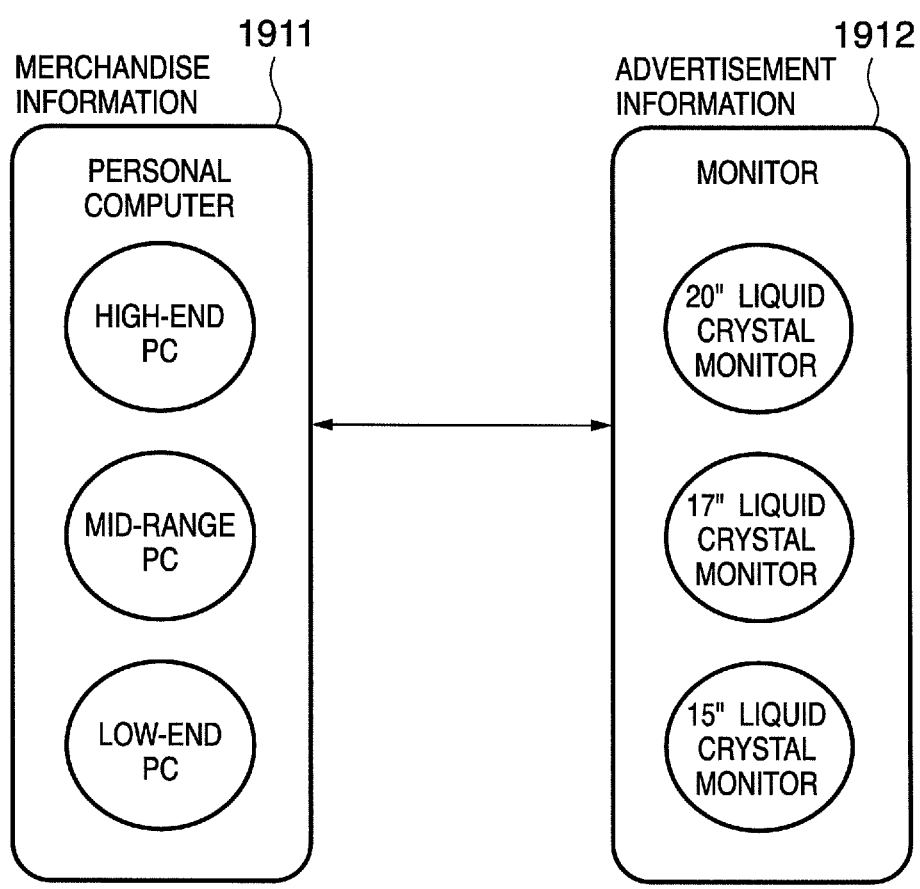
FIG. 19B is a view showing the associated state of the merchandise category and advertisement category according to the embodiment of the present invention.

FIG. 19B is a view showing the associated state of the merchandise category and advertisement category according to the embodiment of the present invention.

FIG. 19B shows that a merchandise category 1911 can be associated with an advertisement category 1912. This association can also be established in two ways, similar to FIG. 19A.

Figure 19C:
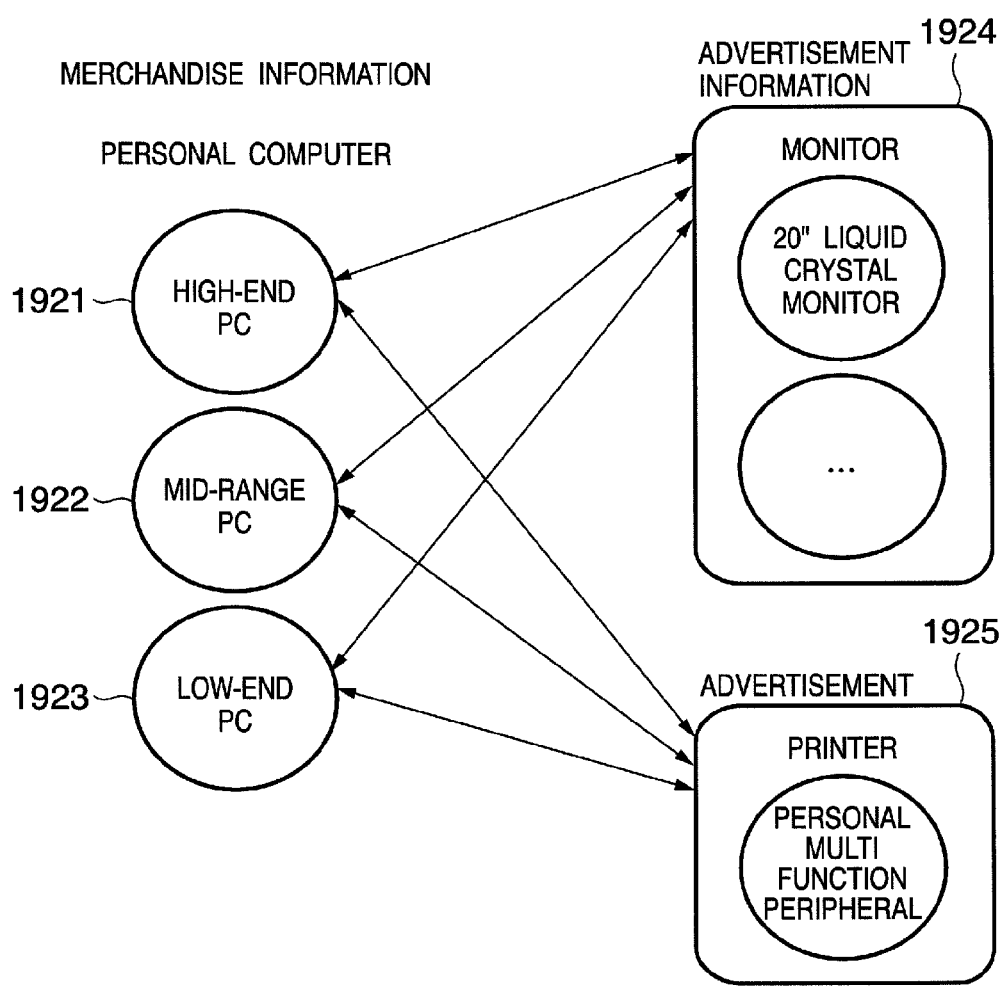
FIG. 19C is a view showing the associated state of merchandise master data and the advertisement category according to the embodiment of the present invention.

FIG. 19C is a view showing the associated state of merchandise master data and the advertisement category according to the embodiment of the present invention.

FIG. 19C shows that merchandise master data 1921 to 1923 can be associated with advertisement categories 1924 and 1925. This association can also be established in two ways, similar to FIG. 19A.

Figure 19D:
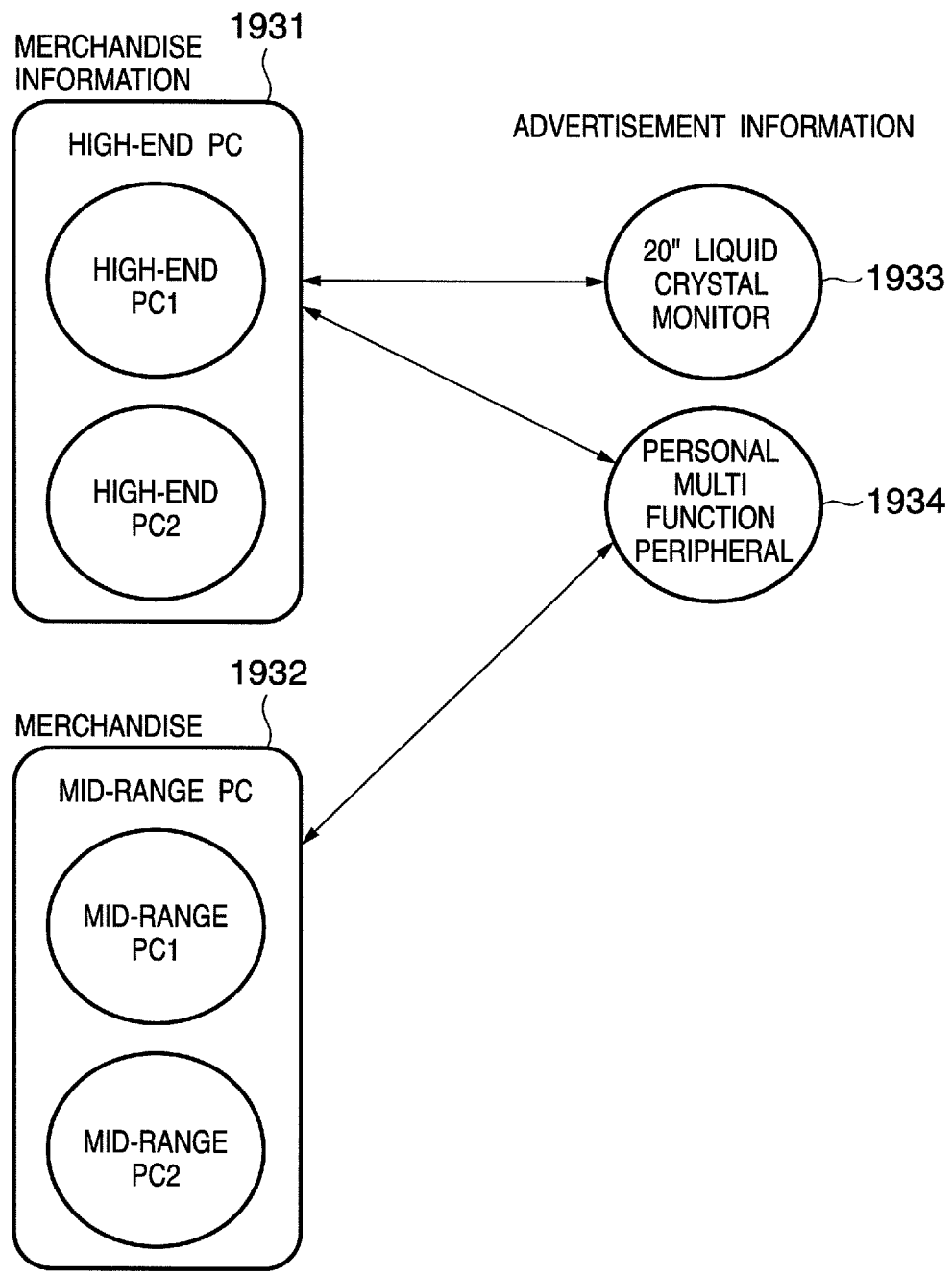
FIG. 19D is a view showing the associated state of the merchandise category and advertisement master data according to the embodiment of the present invention.

FIG. 19D is a view showing the associated state of the merchandise category and advertisement master data according to the embodiment of the present invention.

FIG. 19D shows that merchandise categories 1931 and 1932 can be associated with advertisement master data 1933 and 1934. This association can also be established in two ways, similar to FIG. 19A.

An association process of associating merchandise information and advertisement information will be explained with reference to FIG. 20.

Figure 20:
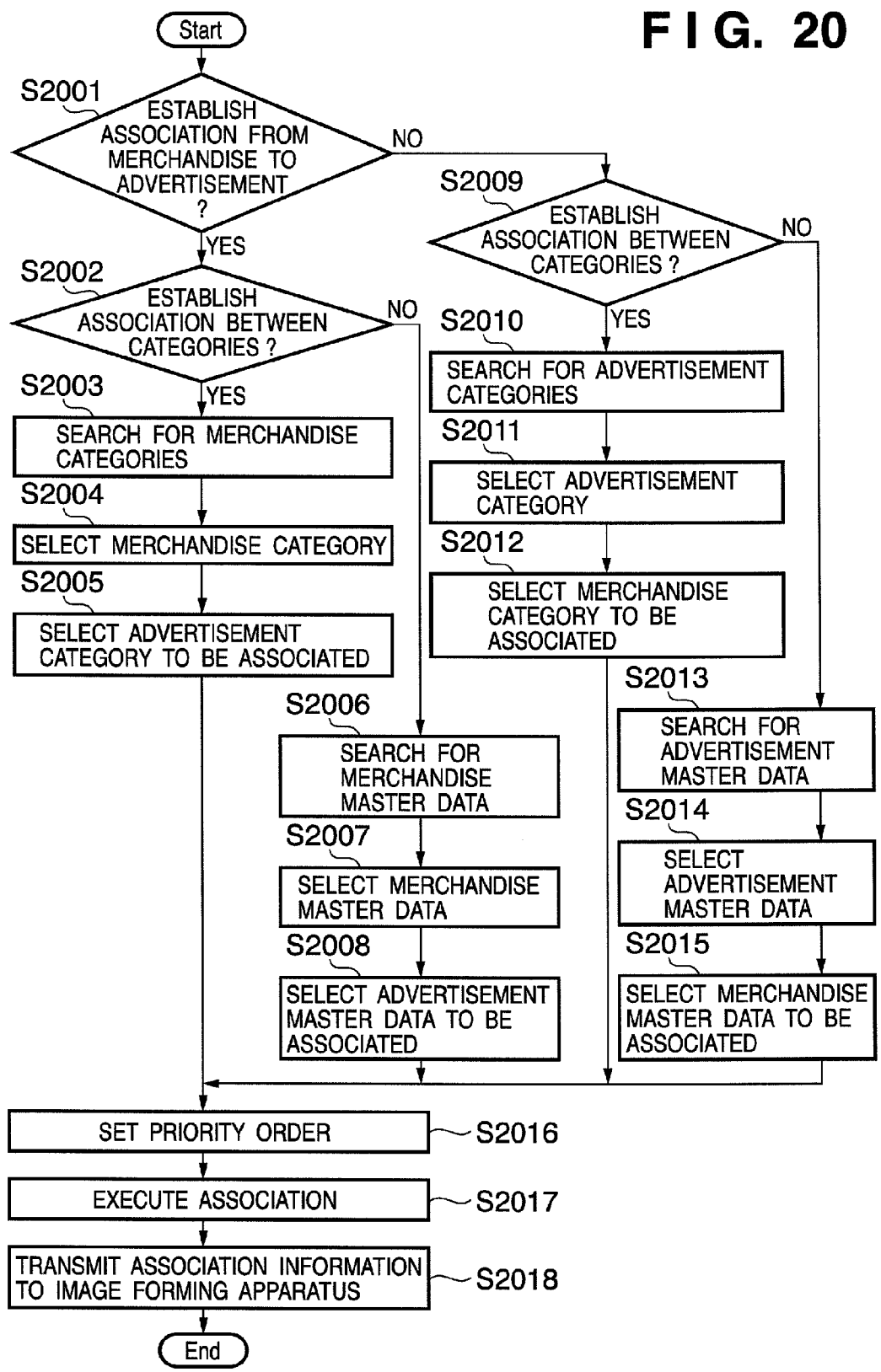
FIG. 20 is a flowchart showing an association process of associating merchandise information with advertisement information according to the embodiment of the present invention.

FIG. 20 is a flowchart showing the association process of associating merchandise information with advertisement information according to the embodiment of the present invention.

This process is implemented by, e.g., the client PC 152 or server PC 161 on the network 107.

In step S2001, it is determined whether to establish association from merchandise information to advertisement information. If association is to be established from merchandise information to advertisement information (YES in step S2001), the flow advances to step S2002 to determine whether to establish association between categories. If association is to be established between categories (YES in step S2002), merchandise categories are searched for in step S2003. In step S2004, a merchandise category is selected from the search results. In step S2005, an advertisement category to be associated is selected.

If it is determined in step S2002 that no association is to be established between categories (NO in step S2002), the flow advances to step S2006 to search for merchandise master data. In step S2007, merchandise master data is selected from the search results. In step S2008, advertisement master data to be associated is selected.

If it is determined in step S2001 that association is to be established from advertisement information to merchandise information (NO in step S2001), the flow advances to step S2009 to determine whether to establish association between categories. If association is to be established between categories (YES in step S2009), the flow advances to step S2010 to search for advertisement categories. In step S2011, an advertisement category is selected from the search results. In step S2012, a merchandise category to be associated is selected.

If it is determined in step S2009 that no association is to be established between categories (NO in step S2009), the flow advances to step S2013 to search for advertisement master data. In step S2014, advertisement master data is selected from the search results. In step S2015, merchandise master data to be associated is selected.

After the association between merchandise information and advertisement information is determined by the above process, the priority order of advertisement information is set in step S2016. The priority order means, e.g., an order to output advertisement information, or the ratio at which an advertisement is output.

In step S2017, the selected merchandise information and advertisement information are associated. The association information and priority order setting information are saved in the database 119. In step S2018, the association information is transmitted to the image forming apparatus 109 on the network.

Figure 22:
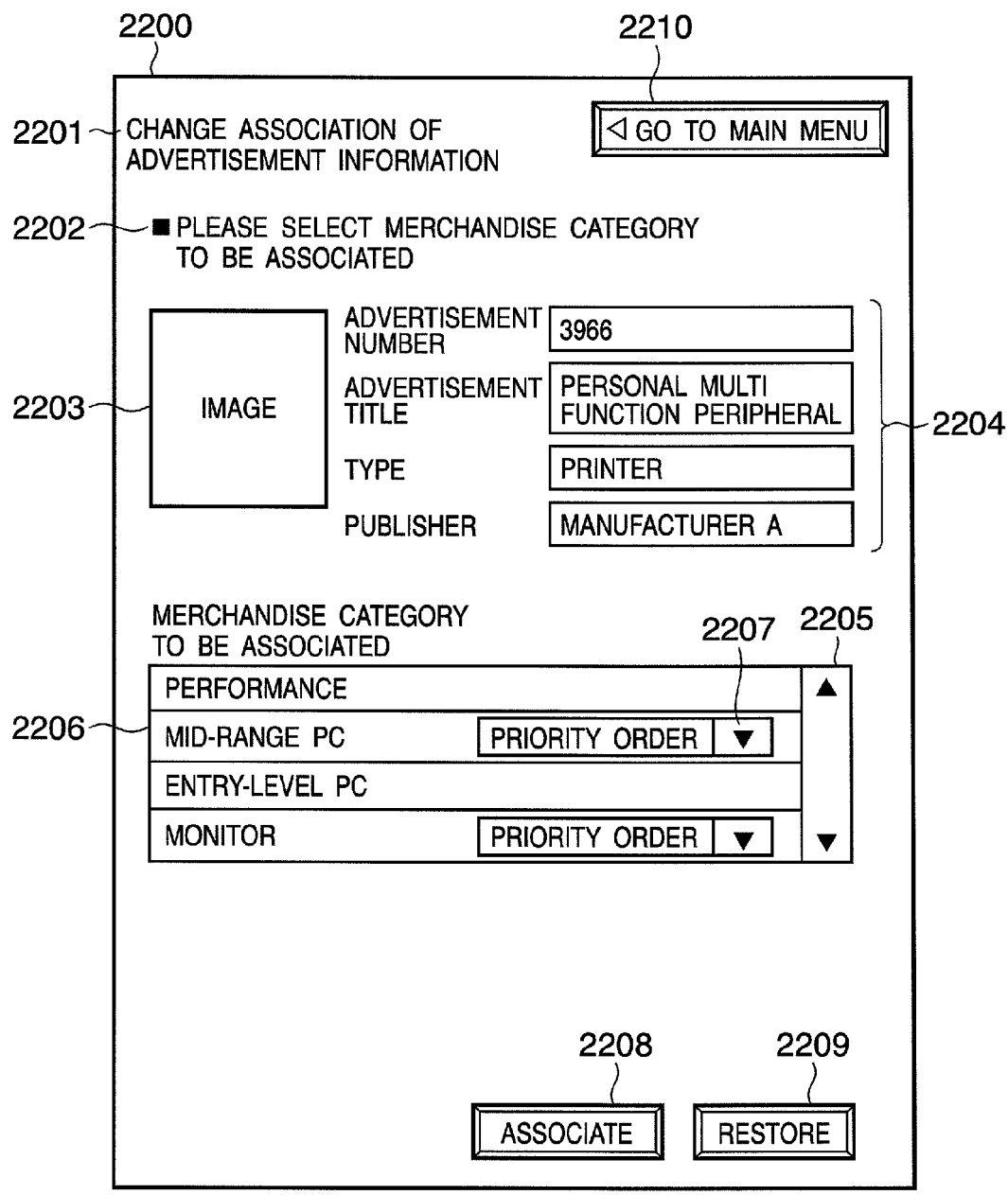
FIG. 22 is a view showing an example of an association window for associating advertisement master data with a merchandise category according to the embodiment of the present invention.

Note that the association information and priority order setting information are set on the basis of an operation to an association window (FIG. 22: to be described later).

[Preview/Output of Document Template (Catalogue Data) with Advertisement Information Field Areas]

Figure 21A:
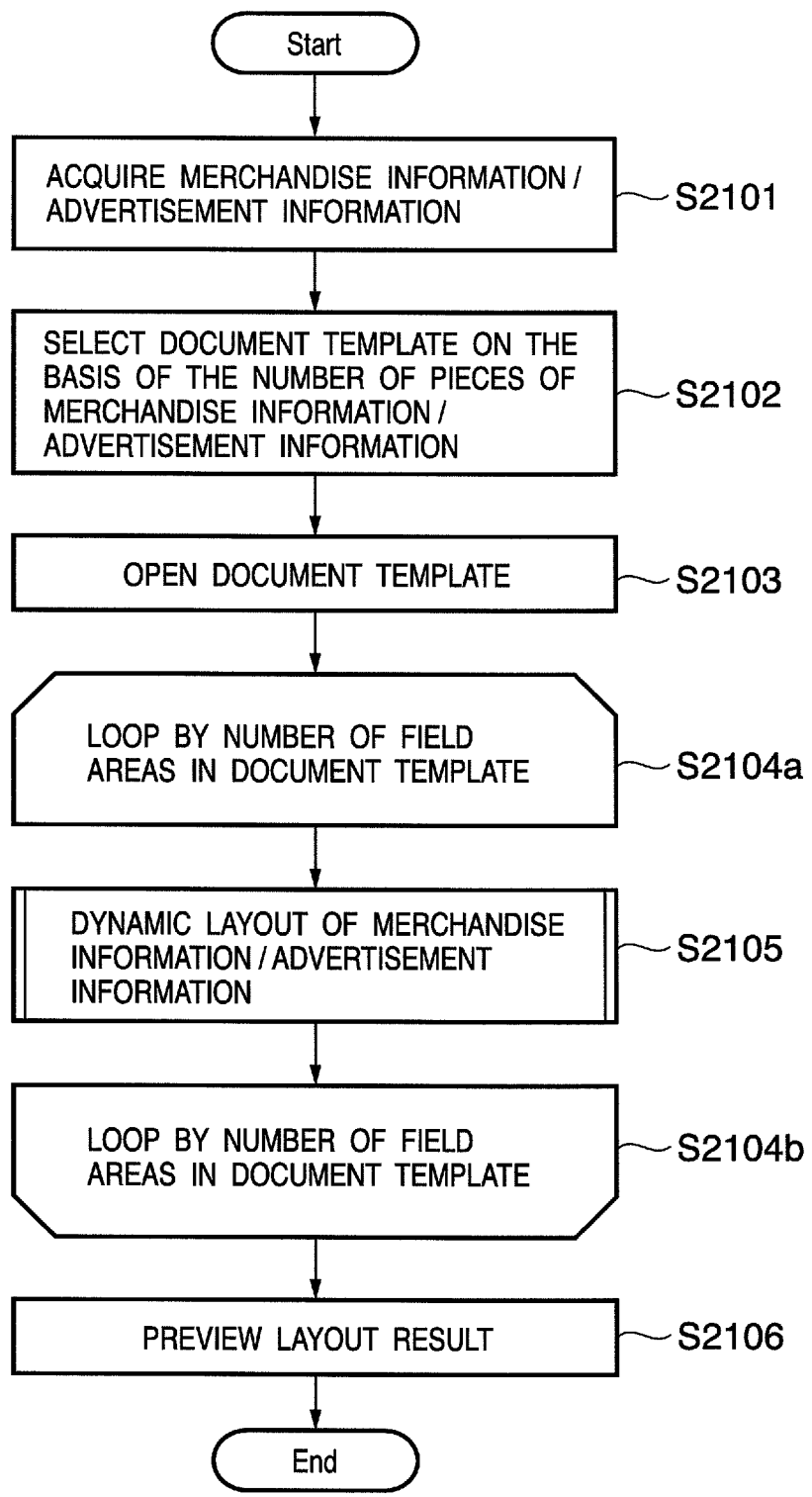
FIG. 21A is a flowchart showing a process of previewing a document template having advertisement information field areas according to the embodiment of the present invention.

FIG. 21A is a flowchart showing a process of previewing a document template having advertisement information field areas according to the embodiment of the present invention.

This process is executed in, e.g., the server PC 161, and the process result is output to the client PC 152.

In step S2101, merchandise information and advertisement information are acquired on the basis of association information.

In step S2102, a document template is selected on the basis of the number of pieces of merchandise information and that of pieces of advertisement information acquired in step S2101. For example, when two advertisement master data are associated with merchandise master data serving as merchandise information, a document template having two advertisement information field areas is selected. This process may be performed by the server PC 161, or available document templates may be displayed on the client PC 152 to prompt the user to select one of them.

In step S2103, the selected document template is opened. In steps S2104a and S2104b, a loop process of repeating the process of step S2105 by the number of advertisement information field areas defined in the document template is executed. Details of the loop process will be explained with reference to FIG. 26.

In step S2105, the server PC 161 inserts the merchandise information and advertisement information into the document template, and executes a dynamic layout according to the above-described layout calculation method (FIG. 8).

In this example, a dynamic layout is executed simultaneously for both the merchandise information and advertisement information, but execution of the dynamic layout is not limited to this. For example, it is also possible to execute a dynamic layout for merchandise information and then execute a dynamic layout for advertisement information associated with the merchandise information in accordance with association information. When priority order is set for advertisement information, a dynamic layout for the advertisement information is executed in accordance with the priority order.

In step S2106, the document template is transmitted as a preview window to the client PC 152 so that the document template (catalogue data) having advertisement information field areas after layout calculation can be previewed.

By the above process, a document in which pieces of advertisement information are inserted into advertisement information field areas on the basis of merchandise information selected in the client PC 152 is created in the server PC 161, and previewed on the client PC 152.

FIG. 21B is a flowchart showing a process of outputting a document template having advertisement information field areas according to the embodiment of the present invention.

In step S2111, merchandise information is selected from the image forming apparatus 109. In step S2112, the image forming apparatus 109 acquires the merchandise information selected in step S2111 and its association information, and transmits them to the server PC 161. In step S2113, the server PC 161 acquires the merchandise information and association information which are transmitted from the image forming apparatus 109, and acquires advertisement information associated with the merchandise information from the database 119.

In step S2114, a document template is selected on the basis of the number of pieces of acquired merchandise information and that of pieces of acquired advertisement information. For example, when two advertisement master data are associated with merchandise master data serving as merchandise information, a document template having two advertisement information field areas is selected. This process may be performed by the server PC 161, or available document templates may be displayed on the client PC 152 to prompt the user to select one of them.

In step S2115, the server PC 161 opens the document template. In steps S2116a and S2116b, the server PC 161 executes a loop process of repeating the process of step S2117 by the number of advertisement information field areas defined in the document template. Details of the loop process will be explained with reference to FIG. 26.

In step S2117, the server PC 161 inserts the merchandise information and advertisement information into the document template, and executes a dynamic layout according to the above-described layout calculation method (FIG. 8).

In this example, a dynamic layout is executed simultaneously for both the merchandise information and advertisement information, but execution of the dynamic layout is not limited to this. For example, it is also possible to execute a dynamic layout for merchandise information and then execute a dynamic layout for advertisement information associated with the merchandise information in accordance with association information. When priority is set for advertisement information, a dynamic layout for the advertisement information is executed in accordance with the priority order.

In step S2118, the server PC 161 transmits, to the image forming apparatus 109, a document template (catalogue data) having advertisement information field areas after layout calculation.

By the above process, a document template (catalogue data) having advertisement areas is created in the server PC 161 on the basis of the merchandise information selected from the image forming apparatus 109, and output from the image forming apparatus 109.

[Association Window]

FIG. 22 is a view showing an example of an association window for associating advertisement master data with a merchandise category according to the embodiment of the present invention.

An association window 2200 implemented by the user interface 103 displays a menu title 2201 and guidance 2202. Reference numeral 2203 denotes an image of merchandise master data to be associated. Reference numeral 2204 denotes information (advertisement number, advertisement title, type, and publisher) representing the contents of advertisement master data to be associated. As the definitions of items representing these pieces of information, the names of items and the number of items can be freely defined by setting the database.

Reference numeral 2205 denotes an area which displays a list of merchandise categories (performance, mid-range PC, entry-level PC, monitor, and the like). A plurality of merchandise categories can be selected from the area 2205. The item of a selected merchandise category, i.e., an item in an area 2206 is inversely displayed. Reference numeral 2207 denotes a drop-down list for setting priority order to insert advertisement information (advertisement master data) for a selected merchandise category.

As the priority order, for example, the order to insert advertisement information, or the frequency at which advertisement information is inserted can be set. Display effects such as "highlight" and "balloon" can also be set in the drop-down list 2207. A button 2208 provides a function of associating advertisement master data and a merchandise category and saving priority order in the database 119. A button 2209 provides a function of restoring a previous window. A button 2210 provides a function of restoring a menu window.

Note that the association window 2200 is implemented on, e.g., the client PC 152 or server PC 161. The association window shown in FIG. 22 is particularly a window for associating advertisement master data and a merchandise category. Needless to say, an association window for associating merchandise information and advertisement information of another type, e.g., associating an advertisement category and merchandise master data, or associating advertisement master data and merchandise master data is similarly configured.

[Operation Window in Image Forming Apparatus]

Figure 23A:
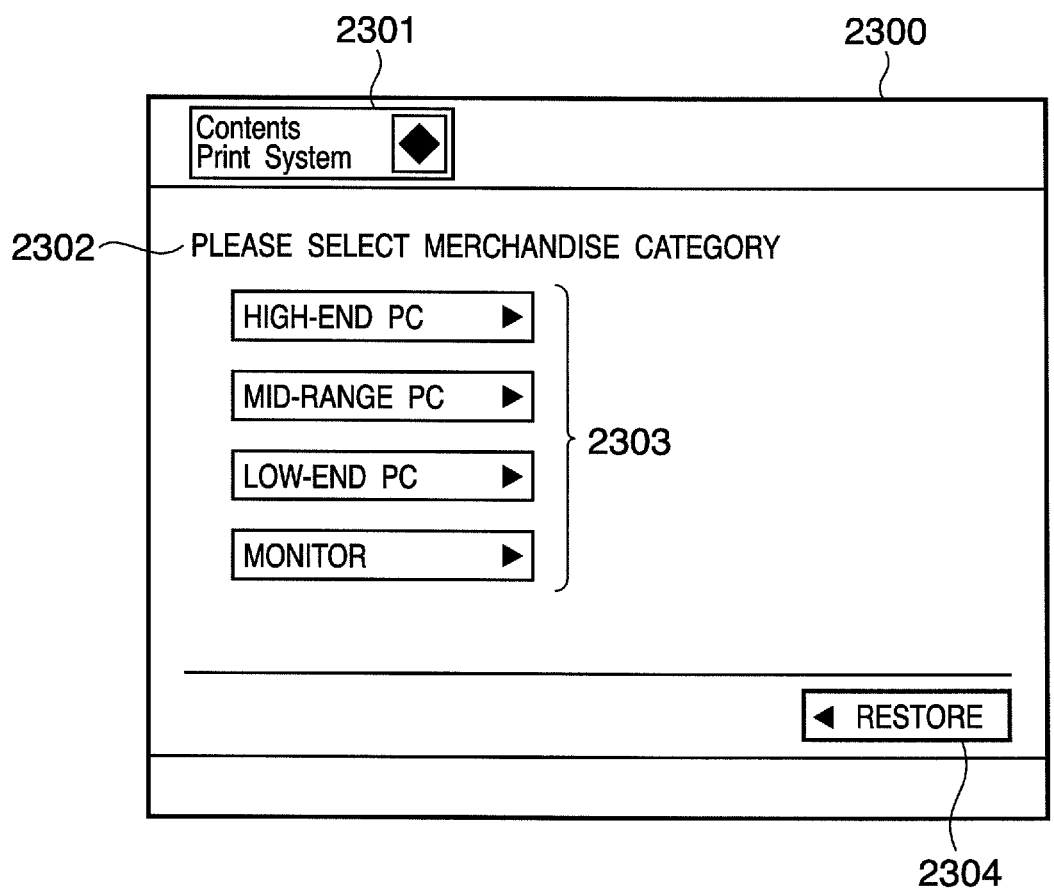
FIG. 23A is a view showing an example of a merchandise category selection window in the image forming apparatus according to the embodiment of the present invention.

FIG. 23A is a view showing an example of a merchandise category selection window in the image forming apparatus according to the embodiment of the present invention.

A merchandise category selection window 2300 displays a logotype 2301 and guidance 2302. Buttons 2303 are used to select respective merchandise categories (high-end PC, mid-range PC, low-end PC, monitor, and the like). When an arbitrary one of the buttons 2303 is pressed, the merchandise category selection window 2300 changes to a merchandise master data list selection window (details will be described with reference to FIG. 23B) representing a list of merchandise master data in a corresponding merchandise category. A button 2304 provides a function of changing to a menu window.

Needless to say, an advertisement category selection window similar to the merchandise category selection window 2300 is configured.

FIG. 23B is a view showing an example of a merchandise master data selection window in the image forming apparatus according to the embodiment of the present invention.

A merchandise master data list selection window 2310 displays the logotype 2301 and guidance 2302. A list 2311 provides a function of displaying a list of merchandise master data belonging to a merchandise category selected in FIG. 23A, and allowing selection of a plurality of merchandise master data. A button 2312 provides a function of outputting catalogue data which is associated with merchandise master data selected from the list 2311 and has advertisement information field areas. A button 2313 provides a function of restoring a merchandise category selection window.

As a matter of course, an advertisement master data selection window similar to the merchandise master data list selection window 2310 is configured.

[Operation Window in Executing Preview]

Figure 24:
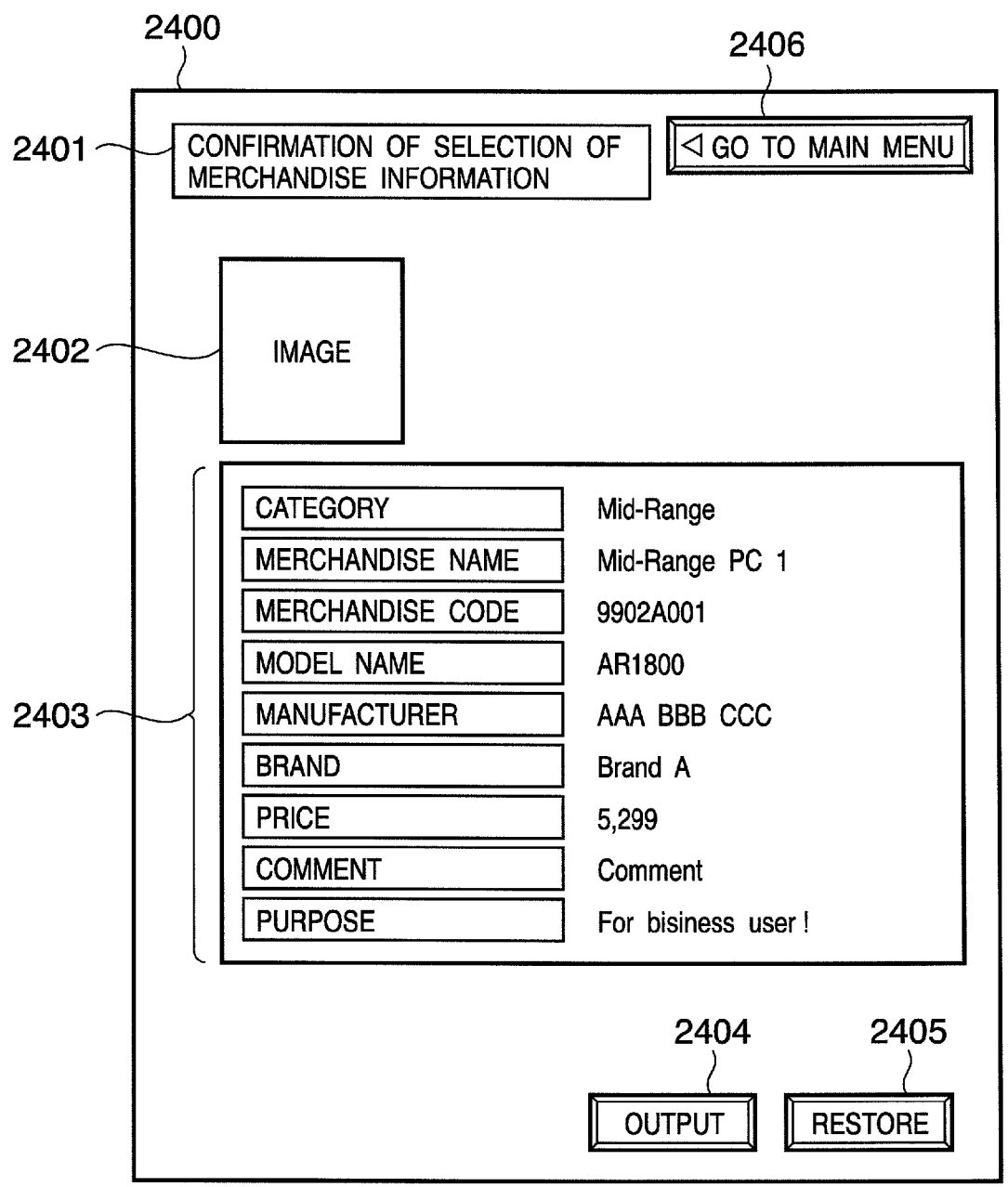
FIG. 24 is a view showing an example of a preview execution window for confirming merchandise information according to the embodiment of the present invention.

FIG. 24 is a view showing an example of a preview execution window for confirming merchandise information according to the embodiment of the present invention.

A preview execution window 2400 displays a menu title 2401 to notify the user to confirm selection of merchandise information (merchandise master data). Reference numeral 2402 denotes an image of selected merchandise master data. Reference numeral 2403 denotes an area representing the items and contents of the selected merchandise master data. In the area 2403, the names of items and the number of items can be changed by the configuration in FIGS. 17 and 18.

A button 2404 provides a function of outputting, as a preview, catalogue data having advertisement information field areas for the selected merchandise master data. An area 2205 provides a function of restoring a previous window. An button 2406 provides a function of restoring a menu window.

The preview execution window shown in FIG. 24 is especially a merchandise information window. Similar to this window, an advertisement information window is configured.

[Example of Layout Change in Output]

Figure 25A:
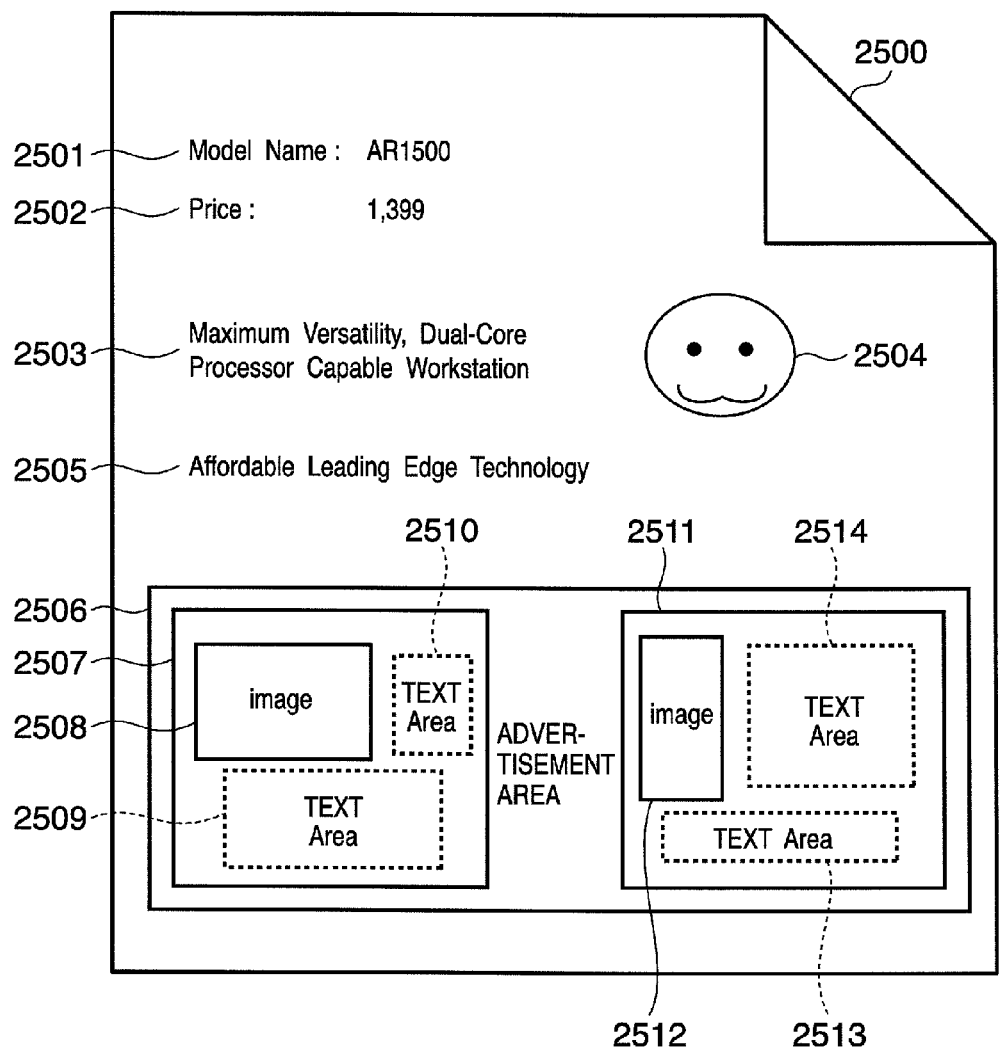
FIG. 25A is a view showing an example of the preview or output result of catalogue data having advertisement information field areas according to the embodiment of the present invention.

FIG. 25A is a view showing an example of the preview or output result of catalogue data having advertisement information field areas according to the embodiment of the present invention.

An operation when data and images (contents) managed by various tables in the actual database 119 are inserted into a document (document template) having merchandise information field areas and advertisement information field areas will be explained.

In an output result 2500, merchandise master data items 2501, 2502, 2503, and 2505, and content data 2504 are dynamically laid out. The items 2501, 2502, 2503, and 2505 and the content data 2504 are defined as containers (field areas) in the document template, respectively. An optimal layout process is dynamically performed by the above-described layout calculation method in accordance with the number of characters to be inserted into each container, the size of contents, and the settings of the document template.

Pieces of advertisement information 2507 and 2511 are inserted into an advertisement information field area 2506. Also in the advertisement information field area 2506, items 2508, 2509, 2510, 2512, 2513, and 2514 are defined as containers (field areas) in the document template. An optimal layout process is dynamically performed by the above-described layout calculation method in accordance with the number of characters to be inserted as advertisement information, the size of contents, and the settings of the document template.

Figure 25B:
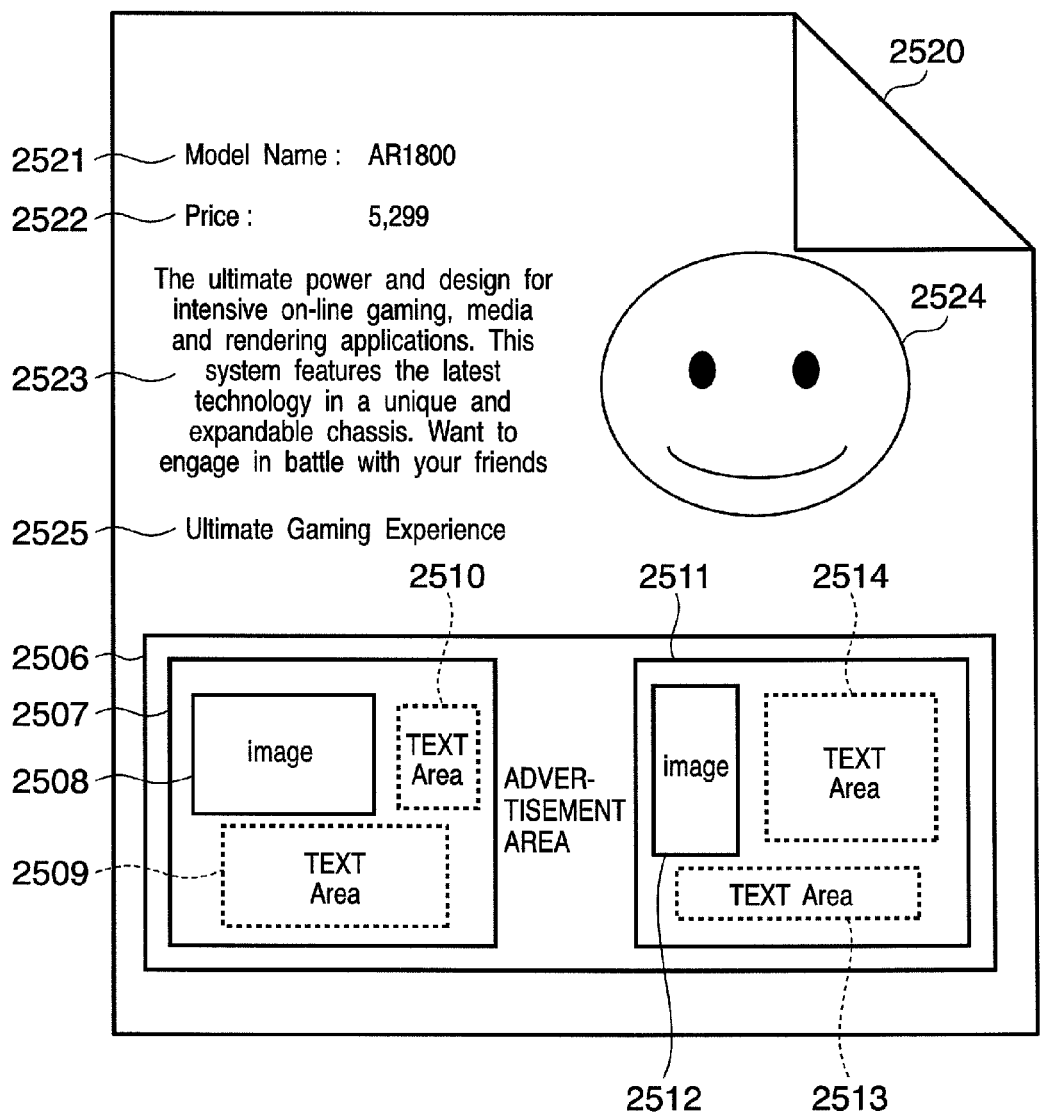
FIG. 25B is a view showing an example of the preview or output result of catalogue data having advertisement information field areas according to the embodiment of the present invention.

FIG. 25B is a view showing an example of the preview or output result of catalogue data having advertisement information field areas according to the embodiment of the present invention.

In FIG. 25B, the same reference numerals as those in FIG. 25A denote the same parts.

In an output result 2520, merchandise master data items 2521, 2522, 2523, and 2525, and content data 2524 are dynamically laid out. The items 2521, 2522, 2523, and 2525 and the content data 2524 are defined as containers (field areas) in the document template, respectively. An optimal layout process is dynamically performed by the above-described layout calculation method in accordance with the number of characters to be inserted into each container, the size of contents, and the settings of the document template.

The output results in FIGS. 25A and 25B are different in the sizes of the containers 2523 and 2524. In this example, the containers 2523 and 2524 in FIG. 25B are larger than the containers 2503 and 2504 in FIG. 25A. This difference comes from the result of optimally dynamically laying out containers in accordance with the number of character data in the database and the size of contents.

Further, pieces of advertisement information 2507 and 2511 are inserted into the advertisement information field area 2506. Also in the advertisement information field area 2506, the items 2508, 2509, 2510, 2512, 2513, and 2514 are defined as containers (field areas) in the document template. An optimal layout process is dynamically performed by the above-described layout calculation method in accordance with the number of characters to be inserted as advertisement information, the size of contents, and the settings of the document template.

Figure 25C:
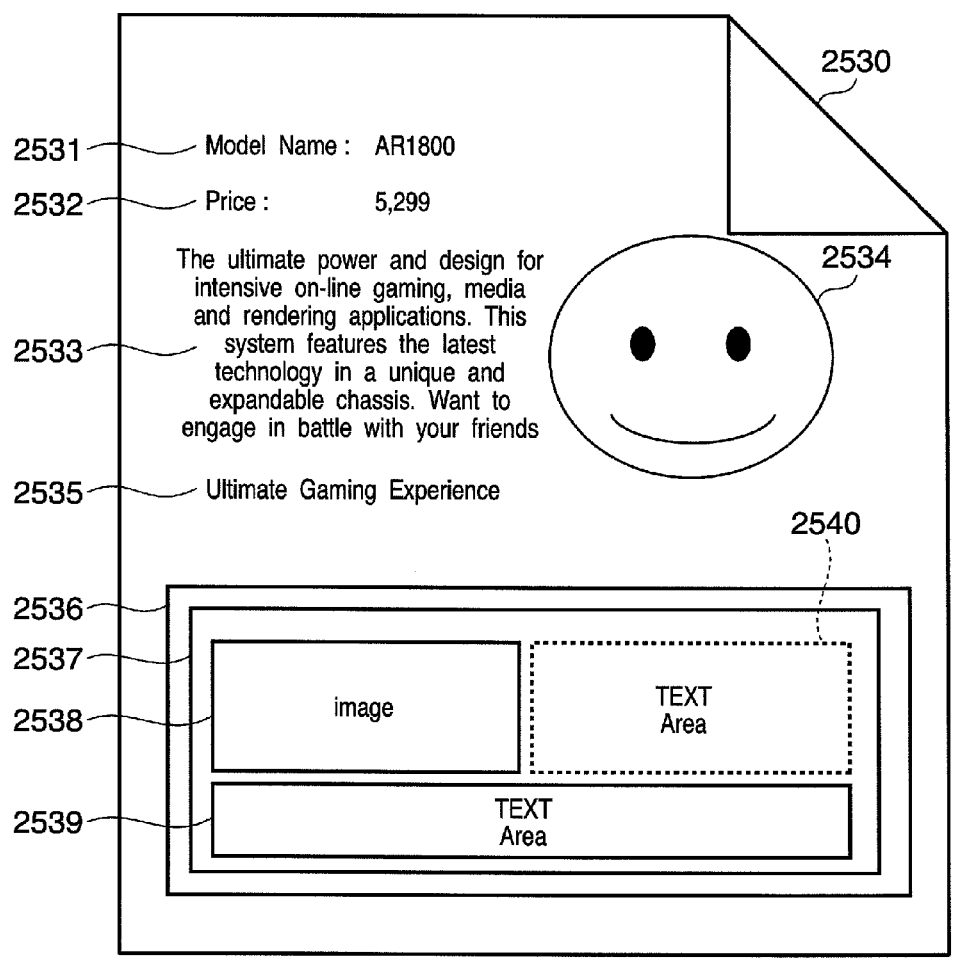
FIG. 25C is a view showing an example of the preview or output result of catalogue data having advertisement information field areas according to the embodiment of the present invention.

FIG. 25C is a view showing an example of the preview or output result of catalogue data having advertisement information field areas according to the embodiment of the present invention.

In an output result 2530, merchandise master data items 2531, 2532, 2533, and 2535, and content data 2534 are dynamically laid out. The items 2531, 2532, 2533, and 2535 and the content data 2534 are defined as containers (field areas) in the document template, respectively. An optimal layout process is dynamically performed by the above-described layout calculation method in accordance with the number of characters to be inserted into each container, the size of contents, and the settings of the document template.

One advertisement information 2537 is defined in an advertisement information field area 2536. Items 2538, 2539, and 2540 are defined as containers (field areas). An optimal layout process is dynamically performed by the above-described layout calculation method in accordance with the number of characters to be inserted as advertisement information, the size of contents, and the settings of the document template.

The output results in FIGS. 25B and 25C are different in the number of pieces of advertisement information in the advertisement information field area 2536. More specifically, in FIG. 25B, an optimal layout process is performed in order to insert the two pieces of advertisement information 2507 and 2511. In FIG. 25C, an optimal layout process is performed in order to insert one advertisement information 2507. The number of pieces of advertisement information in this case may be determined in accordance with the number of advertisement master data or advertisement categories associated with merchandise master data or merchandise categories.

Details of the processes in steps S2102 and S2114 will be explained with reference to FIG. 26.

Figure 26:
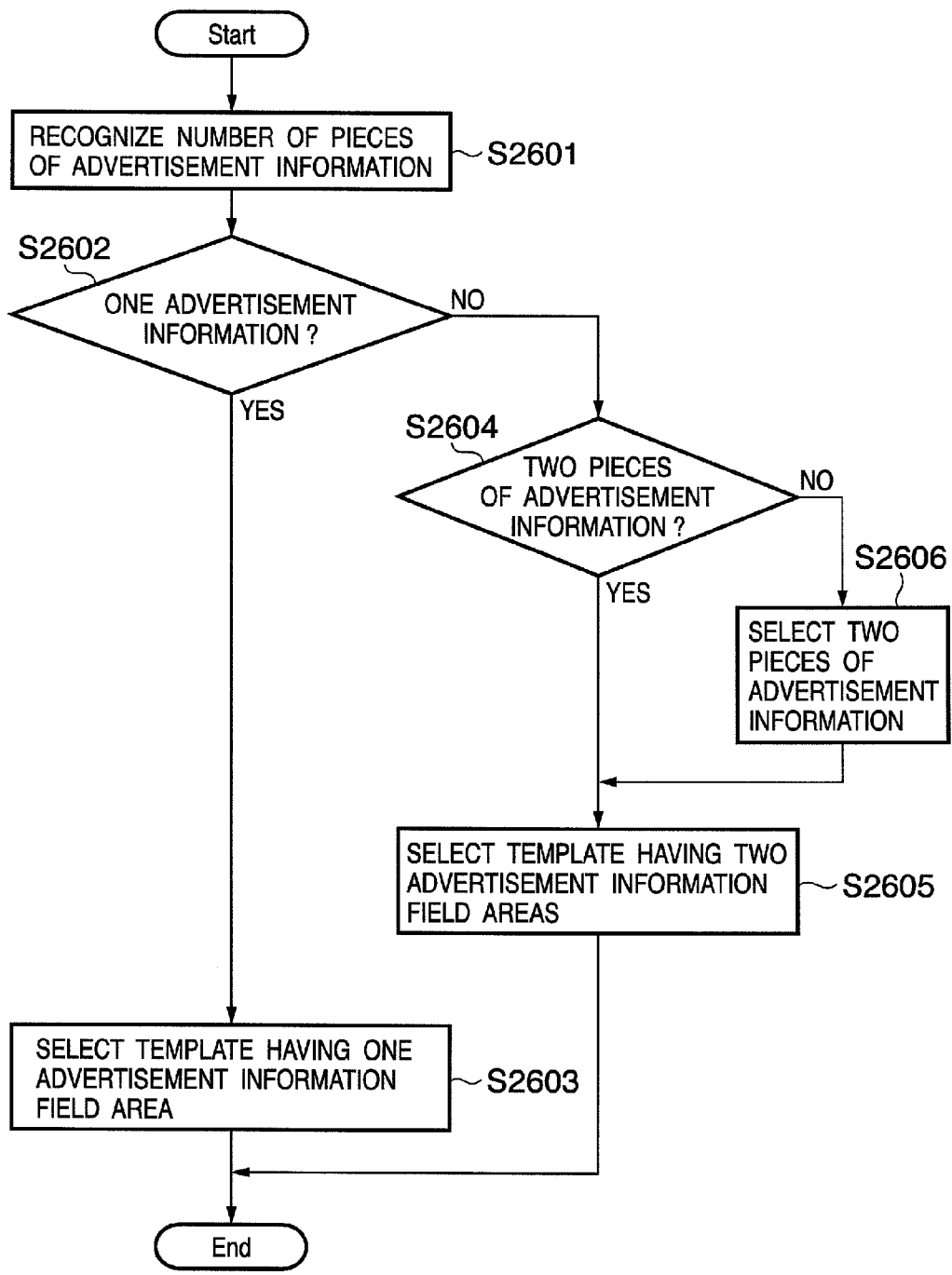
FIG. 26 is a flowchart showing details of processes in steps S2102 and S2114 according to the embodiment of the present invention.

FIG. 26 is a flowchart showing details of the processes in steps S2102 and S2114 according to the embodiment of the present invention.

In step S2601, the number of pieces of advertisement information acquired in step S2101 or S2113 is recognized. In step S2602, it is determined whether the number of pieces of advertisement information is one. If the number of pieces of advertisement information is one (YES in step S2602), the flow advances to step S2603 to select a document template having one advertisement information field area.

If the number of pieces of advertisement information is not one (NO in step S2602), the flow advances to step S2604 to determine whether the number of pieces of advertisement information is two. If the number of pieces of advertisement information is two (YES in step S2604), the flow advances to step S2605 to select a document template having two advertisement information field areas.

If the number of pieces of advertisement information is not two (NO in step S2604), i.e., the number of pieces of advertisement information is three or more, the flow advances to step S2606 to select, from the pieces of advertisement information, two pieces of advertisement information which satisfy a predetermined condition. Then, the flow advances to step S2605.

By the process in FIG. 26, when one advertisement master data is associated with one merchandise master data, a document template having one merchandise information field area and one advertisement information field area is selected.

This process can also cope with a case where there is only a document template having (e.g., one or two) advertisement information field areas smaller in number than (e.g., three) advertisement master data.

More specifically, in the process of step S2606, pieces of advertisement information by the maximum number (e.g., two) of advertisement information field areas of the document template are selected from three or more pieces of advertisement information which satisfy a predetermined condition. In step S2605, a document template having the maximum number (e.g., two) of advertisement information field areas is selected for the pieces of selected advertisement information. After a document template is selected, pieces of advertisement information by the maximum number of advertisement information field areas of the document template may be selected.

In the process of FIG. 26, the number of pieces of advertisement information is one. When, therefore, one advertisement master data is associated with one merchandise master data, a document template having one merchandise information field area and one advertisement information field area is selected.

However, the present invention is not limited to this. For example, the present invention can also be applied to a case where pieces of merchandise information exist. In this case, the number of pieces of acquired merchandise information and that of pieces of advertisement information are recognized in step S2601. For example, it is recognized that the number of pieces of merchandise information is two and that of pieces of advertisement information is two. In this case, a document template having two merchandise information field areas and two advertisement information field areas is selected.

The predetermined condition for selecting advertisement information in step S2606 includes various conditions. For example, use log information of advertisement information may be separately managed, and each advertisement information may be adaptively selected on the basis of the use log information so as to equally use each advertisement information. Alternatively, for example, priority order may be set for pieces of advertisement information and the advertisement information may be selected in accordance with the priority order.

As described above, according to the embodiment, merchandise information (at least one of merchandise master data and a merchandise category) and advertisement information (at least one of advertisement master data and an advertisement category) are associated with each other. A dynamic layout process for the merchandise information and its associated advertisement information is executed by, e.g., the server PC.

As a result, catalogue data having advertisement information field areas can be previewed on the client PC. By selecting merchandise information in the image forming apparatus, a dynamic layout process for the merchandise information and its associated advertisement information can be executed by the server PC to output the process result.

Although the embodiment has described an example of dynamically laying out merchandise information and its associated advertisement information in a page, the type of information is not limited to them. That is, the gist of the present invention resides in that different types of information are associated with each other and dynamically laid out in the same page. Thus, the present invention can be applied to pieces of information which are categorized into different types explicitly by the user and associated between the categories.

The present invention can be more generally expressed as a process of associating the first record belonging to the first information and the second record belonging to the second information, and dynamically laying out the designated first record and its associated second record in the same page on the basis of the document template.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user: computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-231172, filed Aug. 9, 2005, which is hereby incorporated by reference herein in its entirety.

What is claimed is:

1. An information processing apparatus having a host computer which lays out, in a page on the basis of a template, field areas for inserting data of data fields selected from a record made up of a plurality of types of data fields, said host computer comprising:
a first storage unit adapted to store a merchandise table including merchandise information and merchandise key information and an advertisement table including advertisement information and advertisement key information;
a second storage unit adapted to store association information representing association between the merchandise key information and the advertisement key information; and
a layout unit adapted to lay out, in a page on the basis of the template, a field area where a designated merchandise information is inserted, and a field area where advertisement information corresponding to searched advertisement key information is inserted, wherein the searched advertisement key information corresponds to merchandise key information of the designated merchandise information in accordance with the association information;
wherein said layout unit executes lay out of the field area where the merchandise information is inserted before executing lay out of the field area where the advertisement information is inserted.

2. The apparatus according to claim 1, wherein said layout unit executes, in a page on the basis of the template, a lay out of a merchandise record field area where the designated merchandise information is inserted, and then executes, in the same page, lay out of an advertisement record field area where the advertisement record information is inserted.

3. The apparatus according to claim 1, further comprising an output unit adapted to output a layout result by said layout unit.

4. The apparatus according to claim 1, further comprising a setting unit adapted to set the association information representing the association between the merchandise key information and the advertisement key information,
said setting unit further comprising a priority order setting unit adapted to set priority order at which the advertisement information is inserted into the field area,
wherein said priority order is an order to output advertisement or a ratio at which an advertisement is output.

5. The apparatus according to claim 1, further comprising a setting unit adapted to set the association information representing the association between the merchandise key information and the advertisement key information,
said setting unit further comprising a frequency setting unit adapted to set a frequency at which the advertisement information is inserted into the field area.

6. The apparatus according to claim 1, wherein the information processing apparatus is a server apparatus connected to a network.

7. The apparatus according to claim 6, further comprising a transmission unit adapted to transmit, to a client apparatus connected to the network, a preview window for previewing a layout result by said layout unit.

8. The apparatus according to claim 6, further comprising a transmission unit adapted to transmit a layout result by said layout unit to an image forming apparatus connected to the network.

9. A method of controlling an information processing apparatus which lays out, in a page on the basis of a template, field areas for inserting data of data fields selected from a record made up of a plurality of types of data fields, comprising:
a setting step of setting association information representing association between a merchandise table having merchandise information and merchandise key information, and an advertisement table including advertisement information and advertisement key information in a merchandise record and an advertisement record which are stored in a storage medium, the merchandise record belonging to the merchandise information and the advertisement record belonging to the advertisement information; and
a layout step adapted to lay out, in a page on the basis of the template, a field area where a designated merchandise information is inserted, and a field area where advertisement information corresponding to searched advertisement key information is inserted, wherein the searched advertisement key information corresponds to merchandise key information of the designated merchandise information in accordance with the association information;

wherein said layout step lays out the field area where the data of the merchandise is inserted prior to lay out the field area where the data of the advertisement record is inserted.

10. A program stored on a non-transitory computer-readable medium for causing a computer to execute control of an information processing apparatus which lays out, in a page on the basis of a template, field areas for inserting data of data fields selected from a record made up of a plurality of types of data fields, characterized by causing the computer to execute a setting step of setting association information representing association between a merchandise table having merchandise information and merchandise key information, and an advertisement table including advertisement information and advertisement key information in a merchandise record and an advertisement record which are stored in a storage medium, the merchandise record belonging to the merchandise information and the advertisement record belonging to the advertisement information; and a layout step of laying out, in a page on the basis of the template, a field area where a designated merchandise information is inserted, and a field area where advertisement information corresponding to searched advertisement key information is inserted, wherein the searched advertisement key information corresponds to merchandise key information of the designated merchandise information in accordance with the association information;

wherein said layout step lays out the field area where the data of the merchandise is inserted prior to lay out the field area where the data of the advertisement record is inserted.

11. An information processing apparatus having a host computer comprising:

a first storage unit adapted to store a merchandise table including merchandise information and merchandise key information and an advertisement table including advertisement information and advertisement key information;

a second storage unit adapted to store association information representing association between the merchandise key information and the advertisement key information;

a selection unit adapted to select merchandise information;

an acquisition unit adapted to search advertisement key information corresponding to merchandise key information of the merchandise information selected by said selection unit according to the association information, and acquire advertisement information corresponding to the searched advertisement key information;

a determination unit adapted to determine, by using a template, positions and sizes of respective areas where the merchandise information selected by said selection unit and the advertisement information acquired by said acquisition unit are flowed; and a flowing unit adapted to flow the merchandise information and the advertisement information into the areas of the positions and sizes determined by said determination unit;

wherein said determination unit determines a position and size of the area where the merchandise information is flowed before determining a position and size of the area where information on the advertisement information is flowed.

12. The apparatus according to claim 11, wherein the template is determined on the basis of the merchandise information selected by said selection unit and the advertisement information acquired by said acquisition unit.

13. The apparatus according to claim 11, wherein the template is determined on the basis of the number of pieces of advertisement information acquired by said acquisition unit.

14. A layout method comprising:

storing a merchandise table including merchandise information and merchandise key information and an advertisement table including advertisement information and advertisement key information;

storing association information representing association between the merchandise key information and the advertisement key information;

a selection step of selecting merchandise information;

an acquisition step of acquiring search advertisement key information corresponding to merchandise key information of the merchandise information selected by said selection step according to the association information, and acquiring advertisement information corresponding to the search advertisement key information;

a determination step of determining, by using a template, positions and sizes of respective areas where the merchandise information selected in the selection step and the advertisement information acquired in the acquisition step are flowed; and a flowing step of flowing the merchandise information and the advertisement information into the areas of the positions and sizes determined in the determination step, wherein said determination step determines a position and size of the area where information on the merchandise information is flowed prior to determine a position and size of the area where information on the advertisement information is flowed.

15. The method according to claim 14, wherein the template is determined on the basis of the merchandise information selected in the selection step and the advertisement information acquired in the acquisition step.

16. The method according to claim 14, wherein the template is determined on the basis of the number of pieces of advertisement information acquired in the acquisition step.

17. A program stored on a non-transitory computer-readable medium characterized by causing a computer to execute storing a merchandise table including merchandise information and merchandise key information and an advertisement table including advertisement information and advertisement key information;

storing association information representing association between the merchandise key information and the advertisement key information;

a selection step of selecting merchandise information;

an acquisition step of acquiring search advertisement key information corresponding to merchandise key information of the merchandise information selected by said selection step according to the association information, and acquiring advertisement information corresponding to the search advertisement key information;

a determination step of determining, by using a template, positions and sizes of respective areas where the merchandise information selected in the selection step and the advertisement information acquired in the acquisition step are flowed; and a flowing step of flowing the merchandise information and the advertisement information into the areas of the positions and sizes determined in the determination step, wherein said determination step determines a position and size of the area where information on the merchandise information is flowed prior to determine a position and size of the area where information on the advertisement information is flowed.

18. The program according to claim 17, wherein the template is determined on the basis of the merchandise information selected in the selection step and the advertisement information acquired in the acquisition step.

19. The program according to claim 17, wherein the template is determined on the basis of the number of pieces of advertisement information acquired in the acquisition step.

* * * * *